United States Patent
Eto et al.

(10) Patent No.: US 8,367,275 B2
(45) Date of Patent: Feb. 5, 2013

(54) LENGTHY VOLUME HOLOGRAM LAYER TRANSFER FOIL, METHOD OF PRODUCING VOLUME HOLOGRAM LAMINATE USING THE SAME AND VOLUME HOLOGRAM LAMINATE

(75) Inventors: Koji Eto, Tokyo-to (JP); Hirotada Ohkawa, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 545 days.

(21) Appl. No.: 12/126,074

(22) Filed: May 23, 2008

(65) Prior Publication Data
US 2008/0299464 A1    Dec. 4, 2008

(30) Foreign Application Priority Data
May 25, 2007   (JP) ................. 2007-139610

(51) Int. Cl.
    *G03H 1/02*    (2006.01)
    *B44C 3/02*    (2006.01)
(52) U.S. Cl. ..................... 430/1; 430/2; 359/3
(58) Field of Classification Search .......... None
    See application file for complete search history.

(56) References Cited

U.S. PATENT DOCUMENTS

| 6,276,725 | B1 | 8/2001 | Laurash et al. |
| 6,284,708 | B1 * | 9/2001 | Oshima et al. ............ 503/227 |
| 6,371,378 | B1 * | 4/2002 | Brunet et al. ............. 235/492 |
| 6,489,266 | B1 | 12/2002 | Kurokawa et al. |
| 2001/0046630 | A1 * | 11/2001 | Toshine et al. ............ 430/1 |
| 2002/0015897 | A1 * | 2/2002 | Toshine et al. ............ 430/2 |
| 2002/0018253 | A1 * | 2/2002 | Toshine et al. ............ 359/3 |
| 2002/0061451 | A1 | 5/2002 | Kita et al. |
| 2002/0135481 | A1 * | 9/2002 | Conwell et al. ........ 340/572.1 |
| 2003/0059565 | A1 | 3/2003 | Otaki et al. |
| 2003/0134105 | A1 * | 7/2003 | Toshine et al. ........... 428/323 |
| 2006/0005918 | A1 | 1/2006 | Azakami et al. |
| 2006/0275671 | A1 * | 12/2006 | Eto et al. ............. 430/1 |

FOREIGN PATENT DOCUMENTS

| EP | 1538554 | * | 6/2005 |
| EP | 1684254 | * | 7/2006 |
| JP | 3046687 | | 2/1991 |
| JP | 4-44667 U | | 4/1992 |
| JP | 06-308887 A | | 11/1994 |
| JP | 08-248209 | * | 9/1996 |

(Continued)

OTHER PUBLICATIONS

European Search Report: EP 08 15 6733.

*Primary Examiner* — Martin Angebranndt
(74) *Attorney, Agent, or Firm* — Ladas & Parry LLP

(57) ABSTRACT

The present invention provides a lengthy volume hologram layer transfer foil capable of transferring a volume hologram layer continuously to a specified position of a transfer-receiving member. The above problem can be solved by a lengthy volume hologram layer transfer foil according to the present invention, the transfer foil is formed lengthwise and comprises: a substrate, a volume hologram layer which is formed on the substrate and in which a volume hologram is recorded, and a heat seal layer which is formed on the volume hologram layer and which contains a thermoplastic resin, the transfer foil being characterized in that it is provided with a cut portion formed so as to penetrate through the heat seal layer and to cut at least a part of the volume hologram layer, on at least a part of the full width in a direction perpendicular to the longitudinal direction thereof.

6 Claims, 23 Drawing Sheets

FOREIGN PATENT DOCUMENTS

| JP | 2000-229473 | * | 8/2000 |
| JP | 2001-063294 | * | 3/2001 |
| JP | 2004-284096 | * | 10/2004 |
| JP | 2005-070064 | | 3/2005 |

* cited by examiner

HEATING

HEATING

HEATING

LENGTHY VOLUME HOLOGRAM LAYER TRANSFER FOIL, METHOD OF PRODUCING VOLUME HOLOGRAM LAMINATE USING THE SAME AND VOLUME HOLOGRAM LAMINATE

BACKGROUND OF THE INVENTION

1. Field of the Invention

The present invention relates to a lengthy volume hologram layer transfer foil formed length-wise to transfer a volume hologram layer continuously, to a method of producing a volume hologram laminate using the hologram layer transfer foil, and to a volume hologram laminate.

2. Disclosure of the Related Art

Holograms are those in which the wave front of an object light beam is recorded as interference fringes in a photosensitive material by the interference between two beams (object light beam and reference light beam) having the same wavelength, wherein, when a light beam having the same wavelength as a reference light beam used at the time of recording interference fringes is applied, causing a diffraction phenomenon by the interference fringes, whereby the same wave front as that of the original object light beam can be regenerated. The hologram has the advantages, such as in providing a beautiful appearance and in being difficult for reproduction and is therefore frequently used in security applications. Among these, in plastic cards typified by credit cards and cash cards, cards with hologram have come to be widely used from the viewpoint of, primarily, the prevention of reproduction and improvement in design.

Such a hologram can be divided into some types by the recording form of interference fringes. Typically, the hologram can be divided into a surface relief type hologram and a volume type hologram. Here, the surface relief type hologram is a type in which fine convexo-concave pattern is engraved on the surface of a hologram layer to record a hologram. The volume type hologram, on the other hand, is a type in which interference fringes produced by the interference of light are depicted three-dimensionally in the direction of the thickness as fringes differing in refractive index to record a hologram. Among these holograms, the volume type hologram has the advantage that reproduction is more difficult than in the case of the relief type hologram since the volume type hologram is a type in which a hologram image is recorded by a difference in the refractive index of materials, and therefore, the volume type hologram is expected to be used in applications for forgery preventive means used for securities, cards and the like.

Various methods are known corresponding to the subject provided with a hologram as a method of providing a hologram to, for example, securities and cards when a hologram is used for an improvement in design and forgery preventive means. As these methods, for example, a method in which slit-shaped holograms are knitted and a method in which holograms are embedded in a medium in such a manner that they are visible from the outside. However, a method in which holograms are applied to specified positions is generally used. Among these methods, a method in which holograms are transferred to an arbitrary substrate from a hologram layer transfer foil formed with holograms to thereby apply the holograms to specific positions have come to be widely used as a simpler method.

Here, plural materials differing in refractive index are generally used in the volume type hologram and a photopolymerizable material that can be polymerized by irradiating it with specified light is usually used. For this, it is known that the hologram layer in which volume type holograms are recorded tends to be increased in mechanical strength. The volume type hologram has such a nature that a hologram image is recorded by arranging differences in refractive index three-dimensionally and therefore, the thickness of the layer on which the hologram is formed tends to be larger than the relief type hologram. It is pointed out that the volume type hologram is poor in foil cuttability and it is difficult to use a method of transferring a volume type hologram by using the hologram layer transfer foil mentioned above.

In view of this situation, Patent Documents 1 and 2 disclose examples enabling the use of the transfer method using the above-mentioned hologram layer transfer foil even regarding the volume type hologram, by adjusting the breaking strain and breaking strength of the hologram layer in which the volume type hologram is recorded, to each specified value.

[Patent Document 1] Japanese Patent Application Laid-Open No. 3-46687

[Patent Document 2] Japanese Patent Application Laid-Open No. 2005-070064

SUMMARY OF THE INVENTION

In the meantime, a further improvement in generalization is desired for a hologram used for an improvement in design and for prevention of forgeries in view of its usefulness. To cope with this desire, the inventors of the present invention have made an invention concerning a method in which a hologram layer transfer foil is formed longitudinally to transfer a volume hologram continuously in the course of industrial production. Such a method is useful as a method that can transfer a volume hologram continuously. However, in such a method, on the other hand, it is necessary to partly transfer the volume hologram formed on the hologram layer transfer foil though it has been difficult to put this transfer operation to practice in the area of the volume hologram so far. Therefore, it has been clarified that there is the problem that it is demanded of the volume hologram layer to have higher film cuttability than usual in the volume hologram layer transfer foil formed lengthwise.

The present invention has been made to solve such a new problem and mainly relates to production of a lengthy volume hologram layer transfer foil capable of transferring a volume hologram layer continuously to a specified position of a transfer-receiving member.

The above problems can be solved by a lengthy volume hologram layer transfer foil according to the present invention, the transfer foil is formed lengthwise and comprises: a substrate, a volume hologram layer which is formed on the substrate and in which a volume hologram is recorded, and a heat seal layer which is formed on the volume hologram layer and which contains a thermoplastic resin, the transfer foil being characterized in that it is provided with a cut portion formed so as to penetrate through the heat seal layer and cut at least a part of the volume hologram layer, on at least apart of the full width in a direction perpendicular to the longitudinal direction thereof.

According to the present invention, the cut portion is formed so as to penetrate through the heat seal layer and to cut at least a part of the volume hologram layer. Therefore, the volume hologram layer can be easily transferred by peeling the substrate from the volume hologram layer at the position where the cut portion is formed as the starting point when producing a volume hologram laminate by using the lengthy volume hologram layer transfer foil of the present invention.

According to the present invention, the cut portion is formed on at least a part of the full width in a direction perpendicular to the longitudinal direction thereof, whereby the volume hologram layer can be broken at the cut portion as the starting point. Therefore, for example, even in the case of partly transferring the volume hologram layer when the volume hologram laminate is transferred by transferring the volume hologram layer from the lengthy volume hologram layer transfer foil of the present invention, the generation of film cutting failure of the volume hologram layer can be prevented. For this, according to the present invention, a volume hologram layer having a fixed area can be continuously transferred irrespective of the area size of the volume hologram layer to be transferred to a transfer-receiving member.

Thus, the present invention ensures that a lengthy volume hologram layer transfer foil capable of transferring a volume hologram continuously to a prescribed position of a transfer-receiving member can be obtained.

In the present invention, the cut portion is preferably formed over the full width in a direction perpendicular to the longitudinal direction. This is because when the cut portion is formed over the full width in a direction perpendicular to the longitudinal direction, the volume hologram layer can be broken more easily at the cut portion as the starting point.

In the present invention, the cut portion may be made in the form of plural line-shaped cut portions. This is because when the cut portion is made in the form of plural line-shaped cut portions, this can prevent the transferability of the volume hologram layer from being damaged even if the accuracy of the position where a transfer-receiving member is arranged varies when the volume hologram layer is transferred to the transfer-receiving member by using the lengthy volume hologram layer transfer foil of the present invention. A further reason is that when the cut portion is made in the form of plural line-shaped cut portions, a part of the cut portion among the above cut portion is transferred to the transfer-receiving member. Specifically, a forgery preventive effect can be obtained by the transferred cut portion because when it is intended to peel the volume hologram layer from the transfer-receiving member, the volume hologram layer is easily broken at the transferred cut portion as the starting point.

In the present invention, the cut portion may be made in the form of a dotted line-shaped cut portion. This is because this can prevent the transferability of the volume hologram layer from being damaged even if the accuracy of the position where a transfer-receiving member is arranged varies when the volume hologram layer is transferred to the transfer-receiving member by using the lengthy volume hologram layer transfer foil of the present invention.

In the present invention, the peelable over protection layer is preferably formed between the volume hologram layer and the substrate. This is because when the peelable over protection layer is formed, the adhesion of the substrate to the volume hologram layer can be adjusted, with the result that the peelability of the volume hologram layer from the substrate can be improved when the volume hologram layer is transferred from the lengthy volume hologram layer transfer foil of the present invention.

This is also because the peelable over protection layer is eventually transferred together with the volume hologram layer when the volume hologram laminate is produced using the volume hologram layer transfer foil of the present invention and therefore, the transferred volume hologram layer can be protected.

In the present invention, the transfer foil is preferably provided with a pre-forgery preventive cut portion formed so as to penetrate through the heat seal layer and to cut at least a part of the volume hologram layer, at a part of a transfer part which is the part to be transferred to the transfer-receiving member side. This makes it difficult to peel off the volume hologram layer of the volume hologram laminate described later as a continuum when it is intended to peel off the volume hologram layer. Specifically, when it is intended to peel the volume hologram layer as it is, it is easily broken at the forgery preventive cut portion as the starting point. Therefore, it is difficult to reapply a new volume hologram layer, whereby a forgery preventive effect can be obtained.

The present invention relates to a volume hologram laminate comprising: a transfer-receiving member, a heat seal layer formed on the transfer-receiving member, and a volume hologram layer formed on the heat seal layer, the volume hologram laminate being characterized in that it is provided with a forgery preventive cut portion formed so as to penetrate through the heat seal layer and to cut at least a part of the volume hologram layer.

According to the present invention, the volume hologram laminate is provided with a forgery preventive cut portion formed so as to penetrate through the heat seal layer and to cut at least a part of the volume hologram layer. Therefore, when an attempt is made to renew the volume hologram layer applied to the transfer-receiving member, the volume hologram layer is easily broken at the forgery preventive cut portion as the starting point, whereby a volume hologram laminate having excellent forgery preventive function can be obtained.

The present invention relates to a method of producing a volume hologram laminate, the method comprising a transfer-receiving member setting step of using the lengthy volume hologram layer transfer foil according to the present invention to set a transfer-receiving member on the heat seal layer of the lengthy volume hologram layer transfer foil such that the transfer-receiving member is overlapped on the cut portion formed on the lengthy volume hologram layer transfer foil; a heating-adhesion step of heating the heat seal layer so as to make the heat seal layer have such a shape that at least one side thereof is overlapped on the cut portion to adhere the heated area of the heat seal layer to the transfer-receiving member; and a substrate peeling step of peeling the substrate of the lengthy volume hologram layer transfer foil disposed on the area adhered to the transfer-receiving member at the position where the cut portion of the lengthy volume hologram layer transfer foil as the starting point.

According to the present invention, as the lengthy volume hologram layer transfer foil, the lengthy volume hologram layer transfer foil of the present invention is used, the heat seal layer is heated so as to have such a shape that at least one side thereof is overlapped on the cut portion in the heating-adhesion step, and the substrate is peeled off at the position where the cut portion is formed as the starting point in the substrate peeling step, whereby breaking failure of the volume hologram layer which is caused by the transfer can be prevented. For this, according to the present invention, the volume hologram is continuously transferred to a prescribed position of a transfer-receiving member, whereby a volume hologram laminate can be produced stably.

The lengthy volume hologram layer transfer foil of the present invention produces such an effect that it can prevent the transfer failure of a volume hologram layer and transfer the volume hologram layer continuously to a prescribed position of a transfer-receiving member. The volume hologram laminate of the present invention produces an excellent forgery preventive effect.

BEST MODE FOR CARRYING OUT THE INVENTION

The present invention relates to a lengthy volume hologram layer transfer foil, a volume hologram laminate and a method of producing a volume hologram laminate by using the lengthy volume hologram layer transfer foil.

The lengthy volume hologram layer transfer foil, the volume hologram laminate and the method of producing a volume hologram laminate will be explained in this order.

The terms "cut portion", "pre-forgery preventive cut portion" and "forgery preventive cut portion" are defined as follows. The term "cut portion" means a cut portion which is formed on a lengthy volume hologram layer transfer foil used in the present invention and used to transfer the volume hologram layer with ease by peeling off the substrate from the volume hologram layer at the position where the cut portion is formed as the start point when a volume hologram laminate is produced using the lengthy volume hologram layer transfer foil. The term "pre-forgery preventive cut portion" means a cut portion which is formed separately from the "cut portion" on the lengthy volume hologram layer transfer foil and is one transferred together with a part of the transfer part which is the part to be transferred when the lengthy volume hologram layer transfer foil is transferred to a transfer-receiving member. The term "forgery preventive cut portion" means a cut portion which is formed in a volume hologram laminate produced using the lengthy volume hologram layer transfer foil and when a part of the "cut portion" or "pre-forgery preventive cut portion" are transferred together with the lengthy volume hologram layer transfer foil, it constitutes this "forgery preventive cut portion".

A. Lengthy Volume Hologram Layer Transfer Foil

First, the lengthy volume hologram layer transfer foil will be explained. As mentioned above, the lengthy volume hologram layer transfer foil of the present invention is formed lengthwise and comprises: a substrate, a volume hologram layer which is formed on the substrate and in which a volume hologram is recorded, and a heat seal layer which is formed on the volume hologram layer and which contains a thermoplastic resin, the transfer foil being provided with a cut portion formed so as to penetrate through the heat seal layer and to cut at least a part of the volume hologram layer on a part of the full width in a direction perpendicular to the longitudinal direction.

Figure 1A:
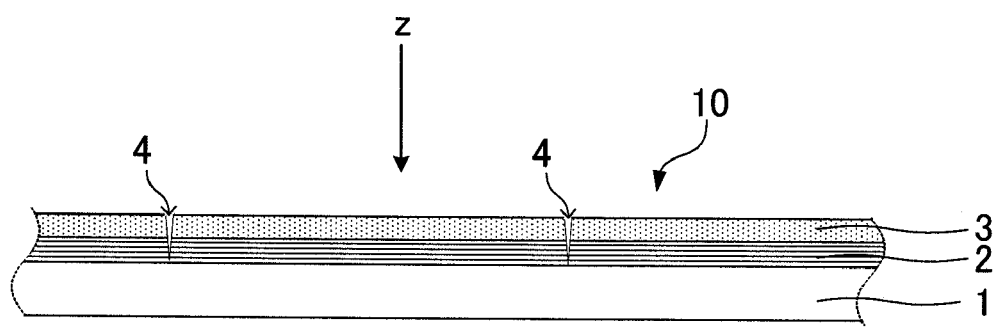
FIGS. 1A and 1B are each a schematic view showing an example of a lengthy volume hologram layer transfer foil according to the present invention.
Figure 1B:
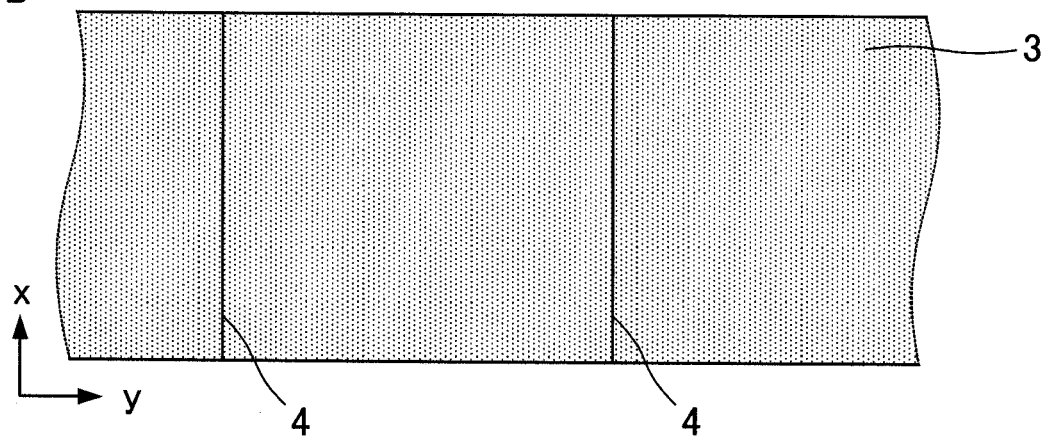

Such a lengthy volume hologram layer transfer foil according to the present invention will be explained with reference to the drawings. FIGS. 1A and 1B are each a schematic sectional view showing an example of the lengthy volume hologram layer transfer foil of the present invention. As illustrated in FIG. 1A, a lengthy volume hologram layer transfer foil 10 according to the present invention comprises a substrate 1, a volume hologram layer 2 which is formed on the substrate 1 and in which a volume hologram is recorded, and a heat seal layer 3 which is formed on the volume hologram layer 2 and which contains a thermoplastic resin. As shown in FIG. 1A, the lengthy volume hologram laminate of the present invention is formed lengthwise.

In such an example, the lengthy volume hologram layer transfer foil 10 of the present invention is characterized in that a cut portion 4 is formed so as to penetrate through the heat seal layer 3 and to cut at least a part of the volume hologram layer 2.

Here, FIG. 1B is a schematic view of the lengthy volume hologram layer transfer foil 10 of the present invention when normally viewed from the direction of z in FIG. 1A. As illustrated in FIG. 1B, the cut portion 4 is formed over the full width in the direction x perpendicular to the longitudinal direction y of the lengthy volume hologram layer transfer foil 10.

According to the present invention, the cut portion is formed so as to penetrate through the heat seal layer and to cut at least a part of the volume hologram layer. This ensures that when a volume hologram laminate is produced using the lengthy volume hologram layer transfer foil of the present invention, the substrate is peeled from the volume hologram layer at the position where the cut portion is formed as the starting point, whereby the volume hologram layer can be transferred with ease.

According to the present invention, the cut portion is formed on at least a part of the full width in a direction perpendicular to the longitudinal direction, thereby making it possible to break the volume hologram layer at the cut portion as the starting point. For this, a film cutting failure of the volume hologram layer can be prevented even in the case of transferring the volume hologram layer partly when the volume hologram laminate is transferred by transferring the volume hologram layer from the lengthy volume hologram layer transfer foil. Therefore, according to the present invention, a volume hologram layer having a specified area can be continuously transferred irrespective of the area size of the volume hologram layer to be transferred to a transfer-receiving member.

From this fact, the present invention ensures that a lengthy volume hologram layer transfer foil can be obtained which can transfer a volume hologram continuously to a prescribed position of a transfer-receiving member.

The lengthy volume hologram layer transfer foil of the present invention includes at least a substrate, a volume hologram layer and a heat seal layer, and as needed, layers which will be described later in the paragraph "5. Other layers" and a pre-forgery preventive cut portion which will be explained later in the paragraph "6. Pre-forgery preventive cut portion".

Each structure used in the lengthy volume hologram layer transfer foil of the present invention will be explained step by step.

1. Cut Portion

First, the cut portion formed on the lengthy volume hologram layer transfer foil of the present invention will be explained. The cut portion in the present invention is formed on at least a part of the full width in a direction perpendicular to the longitudinal direction of the lengthy volume hologram layer transfer foil of the present invention so as to penetrate through the heat seal layer which will be explained later and to cut at least a part of the volume hologram layer which will be also described later.

This cut portion will be explained in detail.

(1) Aspect of the Formation in the Direction of the Thickness

First, an aspect in which the cut portion is formed in the direction of the thickness of the lengthy volume hologram layer transfer foil of the present invention will be explained. When the direction of the thickness is set as a standard, the cut portion is formed so as to penetrate through the heat seal layer which will be explained later and to cut at least a part of the volume hologram layer which will be also explained later.

As to the aspect in which the cut portion is formed in the direction of the thickness, no particular limitation is imposed on it insofar as it has a structure in which the cut portion is formed so as to penetrate through the heat seal layer and to cut at least a part of the volume hologram layer which will be explained later. In the present invention, in particular, the cut portion is formed so as to cut, preferably, at least ⅓ or more, and more preferably ½ or more of the volume hologram layer. This is because when the cut portion is formed like this, the occurrence of breaking failures of the volume hologram layer can be prevented more effectively in the case of producing the volume hologram laminate by transferring the volume hologram layer from the lengthy volume hologram layer transfer foil of the present invention.

Moreover, in the present invention, it is more preferable that the cut portion be formed in such a manner as to completely cut the volume hologram layer. This is because the problem concerning cutting failure of the volume hologram layer when the volume hologram laminate is produced using the lengthy volume hologram layer transfer foil of the present invention is eliminated.

When a layer (herein after, referred to as "other layer" in this paragraph) which will be described in the paragraph "5. Other layers" is formed between the substrate and the volume hologram layer which will be explained later, the cut portion may be formed in such a manner as to cut or not to cut the other layer. When the cut portion is formed in such a manner as to cut the other layer, an aspect in which the cut portion is formed in such a manner as to cut only at least a part of the other layer or an aspect in which the cut portion is formed in such a manner as to completely cut the other layer are allowed.

More specifically, it is preferable that the lengthy volume hologram layer transfer foil preferably has a structure in which a peelable over protection layer is formed between the substrate and the volume hologram layer as will be mentioned later. In this case, this structure may include an aspect in which the cut portion is formed in such a manner as to cut only at least a part of the peelable over protection layer, an aspect in which the cut portion is formed in such a manner as to completely cut the peelable over protection layer, and an aspect in which the cut portion is formed in such a manner as not to cut the peelable over protection layer at all.

Though in the present invention, the cut portion may be formed in such a manner as to cut a part of the substrate, it is preferably formed in such a manner as not to cut the substrate. This is because if the cut portion is formed on a part of the substrate, the substrate is broken when the volume hologram layer is transferred and therefore, there is the possibility that it is difficult to transfer the volume hologram layer continuously since the lengthy volume hologram layer transfer foil of the present invention is preferably used to produce a volume hologram laminate by transferring the volume hologram layer continuously.

(2) Aspect of the Formation in the in-Plane Direction

Next, explanations are furnished as an aspect in which the cut portion is formed in the in-plane direction of the lengthy volume hologram layer transfer foil of the present invention. When the in-plane direction is defined as a standard, the cut portion in the present invention is formed on at least a part of the full width in a direction perpendicular to the longitudinal direction of the lengthy volume hologram layer transfer foil. Here, the term "direction perpendicular to the longitudinal direction" includes, besides the case where the direction is strictly perpendicular to the longitudinal direction, the case where the direction is substantially perpendicular to the extent that the cut portion can exhibit its function.

Figure 2A:
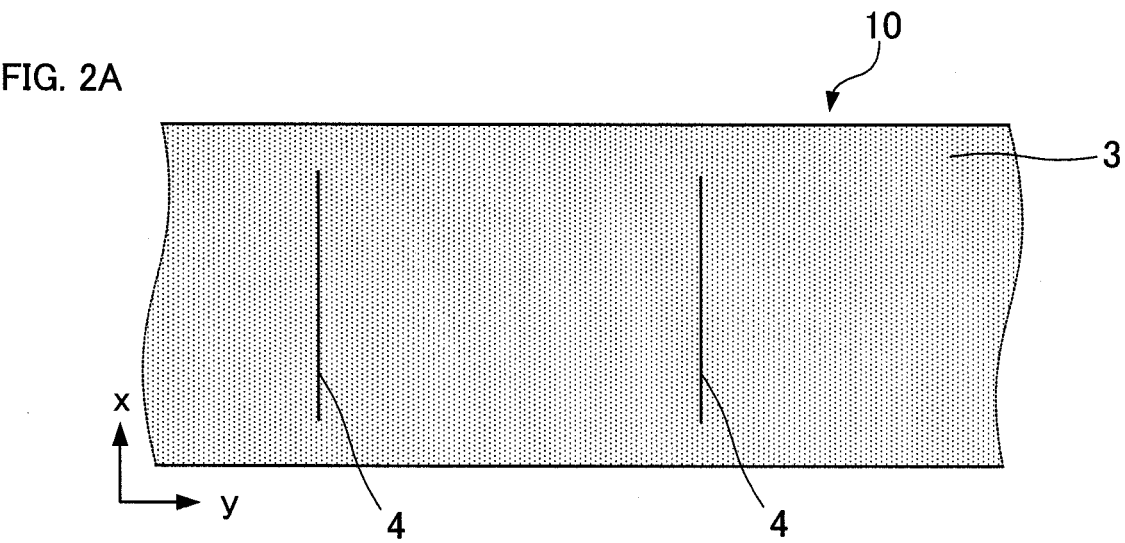
FIGS. 2A to 2C are each a schematic view showing an example of an aspect in which a cut portion is formed.
Figure 2B:
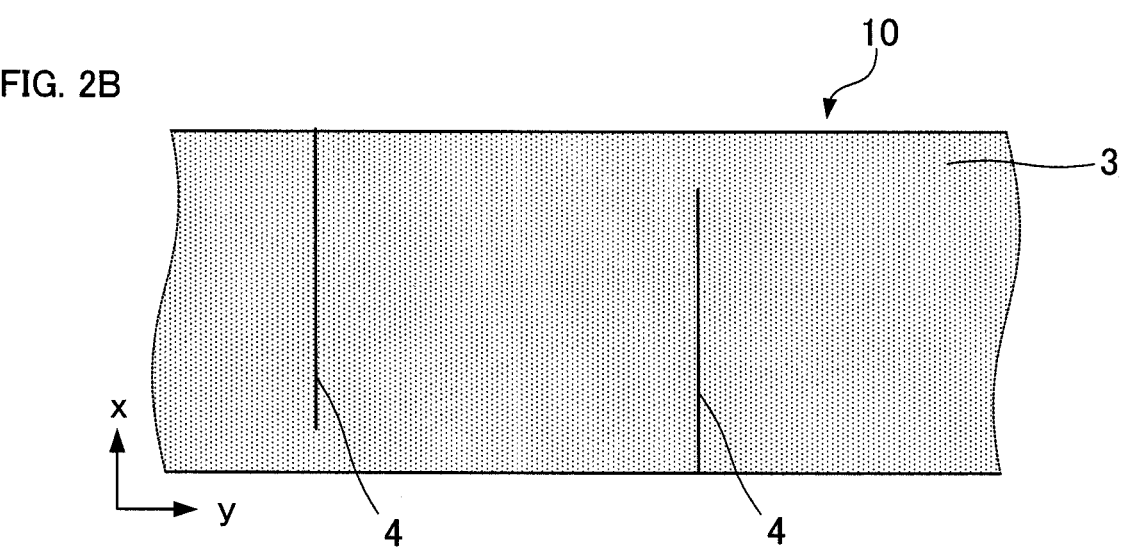
Figure 2C:
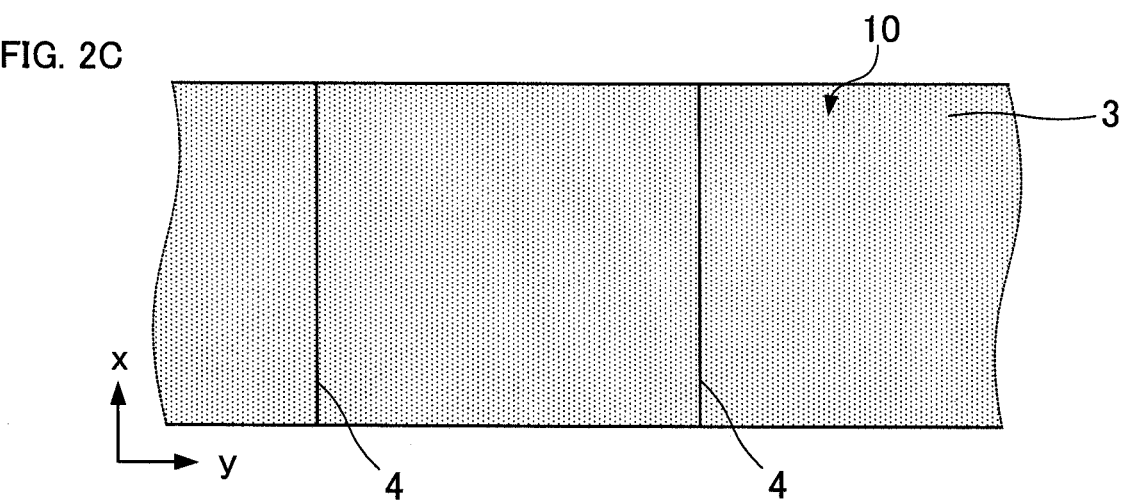

No particular limitation is imposed on the aspect in which the cut portion is formed in the in-plane direction insofar as it is an aspect in which the cut portion is formed on at least a part of the full width in a direction perpendicular to the longitudinal direction of the lengthy volume hologram layer transfer foil. FIGS. 2A to 2C are each a schematic view showing an example of the aspect in which the cut portion is formed. Examples of the aspect in which the cut portion is formed on at least a part of the full width may include, an aspect in which the cut portion 4 is formed in a range excluding both ends of the full width as illustrated in FIG. 2A, an aspect in which the cut portion 4 is formed in a range extending from one end to the halfway of the width as illustrated in FIG. 2B, and an aspect in which the cut portion 4 is formed over the full width as illustrated in FIG. 2C, in the lengthy volume hologram layer transfer foil 10 of the present invention. In the present invention, particularly the aspect in which the cut portion is formed over the full width is preferable. The aspect in which the cut portion is formed over the full width is more effective to prevent film cutting failure. These aspects may be used in combinations of two or more according to the need.

Moreover, aspects in which the cut portion is made in the form of a linear line, curved line or bend line may be adopted. Though, in the present invention, any of these aspects is preferably used, particularly, the aspect in which the cut portion is made in the form of a linear line is preferable. This is because when the cut portion is made in the form of a linear line, the cut portion can be easily formed at a specified position. This is also because the occurrence of breaking failures of the volume hologram layer can be prevented more effectively.

There is no particular limitation to the aspect in which the cut portion is made in the form of a linear line insofar as it is an aspect in which the cut portion serves as the starting point from which a volume hologram layer is broken when the volume hologram layer is transferred in accordance with the shape of a transfer-receiving member to which the volume hologram layer is transferred by using the lengthy volume hologram layer transfer foil of the present invention. Examples of such an aspect may include an aspect in which the cut portion is made in the form of a solid line-shaped cut portion and an aspect in which the cut portion is made in the form of a dotted line-shaped cut portion. In the present invention, any of these aspects is preferably used. These aspects may be combined upon use according to the need.

When the cut portion is made in the form of a solid line- or dotted line-shaped cut portion, the cut portion in the present invention is preferably made in the form of plural line-shaped cut portions. This is because the cut portion can prevent the transferability of the volume hologram layer from being damaged even if the accuracy of the position to which a transfer-receiving member is arranged varies when the volume hologram layer is transferred to the transfer-receiving member by using the lengthy volume hologram layer transfer foil of the present invention. Moreover, when the cut portion is made in the form of plural line-shaped cut portions, a part of the cut portion made in the form of plural line-shaped cut portions is transferred to a transfer-receiving member and constitutes a forgery preventive cut portion as will be described later in the paragraph "3. Forgery preventive cut portion" of "B. Volume hologram laminate". Thus, for example, the volume hologram laminate produced by transferring the lengthy volume hologram layer transfer foil of the present invention is eventually provided with the forgery preventive cut portion. When it is intended to peel the volume hologram layer from the transfer-receiving member of the volume hologram laminate, the volume hologram layer is easily broken at the forgery preventive cut portion as the starting point, making it possible to obtain a forgery preventive effect. The description reading as follows: the cut portion is made "in the form of plural line-shaped cut portions" in the present invention means that: plural linear line cut portions parallel to each other are formed as a unit, or plural linear line cut portions substantially parallel to each other are formed as a unit.

Figure 3A:
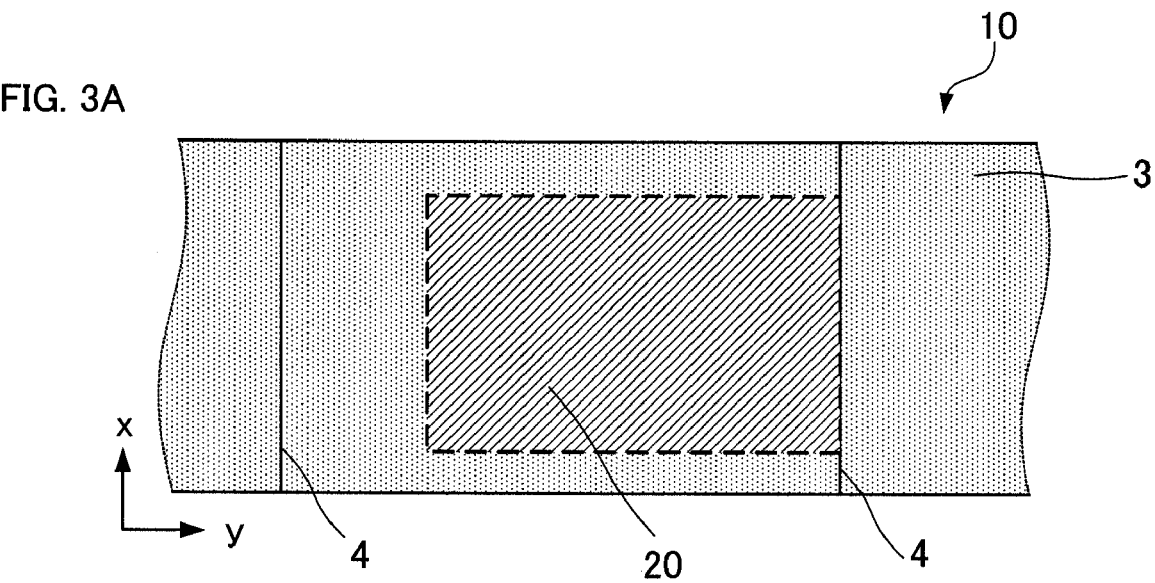
FIGS. 3A and 3B are each a schematic view for explaining the advantages obtained when a cut portion is made in the form of plural line-shaped cut portions.
Figure 3B:
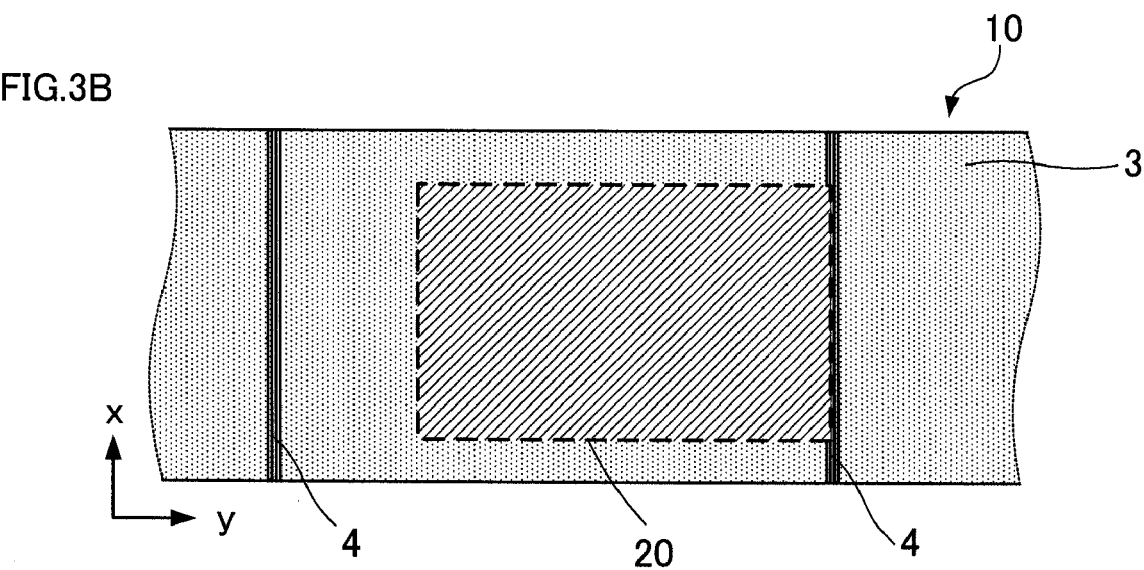

Here, the following descriptions will be furnished with reference to the drawings to explain, in detail, the reason why the transferability of the volume hologram layer can be prevented from being damaged even if the accuracy of the position where a transfer-receiving member is arranged varies when the volume hologram layer is transferred to the transfer-receiving member, if the cut portion is made in the form of plural line-shaped cut portions. FIGS. 3A and 3B are each a schematic view showing an example of a preferable aspect using the lengthy volume hologram layer transfer foil of the present invention. As illustrated in FIG. 3A, an aspect in which a transfer-receiving member 20 is set such that one end of the transfer-receiving member 20 accords to the cut portion 4 and then, a volume hologram layer (not shown) is transferred to the transfer-receiving member 20 may be given as an example of a preferable aspect using the lengthy volume hologram layer transfer foil of the present invention. At this time, if the cut portion 4 is made in the form of single line as illustrated in FIG. 3A, highly accurate position control is required to accord the cut portion 4 to the end of the transfer-receiving member 20. Therefore, when a variation in the position where the transfer-receiving member 20 is set occurs, so that the end of the transfer-receiving member 20 is set at a position deviated from the cut portion 4, the starting point at which the volume hologram layer is transferred is deviated and therefore, there is a fear that the transferability of the volume hologram layer is deteriorated.

However, if the cut portion 4 is made in the form of plural line-shaped cut portions as illustrated in FIG. 3B, the transfer-receiving member 20 can be set such that its end accords to any of the plural line-shaped cut portions of the cut portion 4 even if a variation in the position at which the transfer-receiving member 20 is set occurs. For this, even if a variation in the accuracy of the position where the transfer-receiving member is set occurs, deterioration in the transferability of the volume hologram layer can be prevented.

Examples of the aspect in which the cut portion is made in the form of plural line-shaped cut portions may include: an aspect in which a cut portion constituted of a unit of plural solid line-shaped cut portions is formed, an aspect in which a cut portion constituted of a unit of plural dotted line-shaped cut portions is formed, and an aspect in which a cut portion constituted of a unit of solid line-shaped cut portions and dotted line-shaped cut portions is formed. In the present invention, any of these aspects can be preferably used.

Here, when the aspect in which the cut portion is made in the form of plural line-shaped cut portions is an aspect in which a cut portion constituted of a unit of plural dotted line-shaped cut portions is formed, the transferability of the volume hologram layer can be prevented from being damaged even if the accuracy of the position where a transfer-receiving member is arranged varies when the volume hologram layer is transferred to the transfer-receiving member. The reason will be explained with reference to the drawings.

Figure 4A:
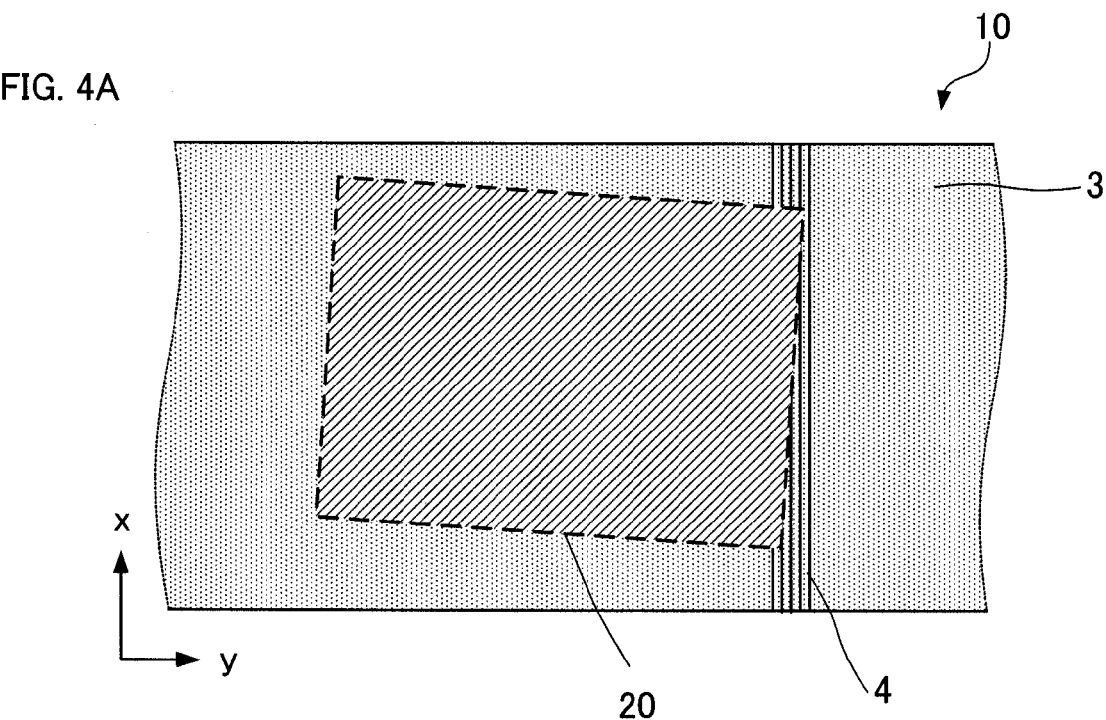
FIGS. 4A and 4B are each a schematic view for explaining the advantages obtained when a cut portion is made in the form of plural dotted line-shaped cut portions.
Figure 4B:
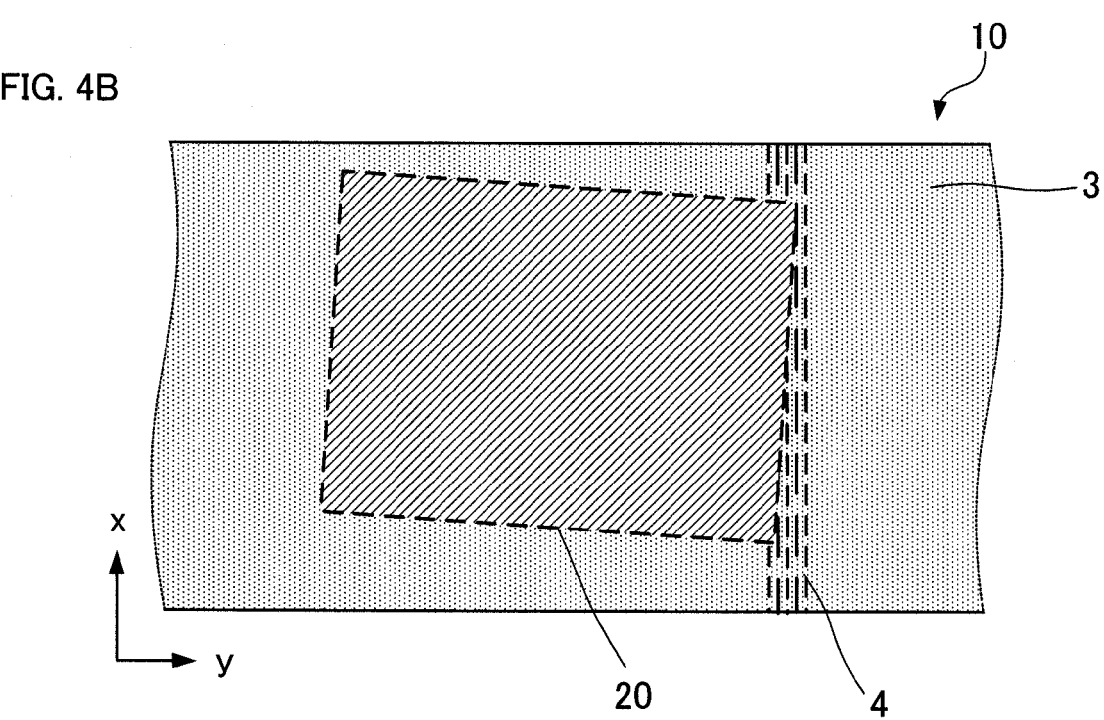

FIGS. 4A and 4b are each a schematic view for explaining the advantage obtained in the case where the cut portion is formed of a unit of plural dotted line-shaped cut portions. As one of preferable aspects using the lengthy volume hologram layer transfer foil of the present invention, as mentioned above, an aspect may be given in which a transfer-receiving member is set such that the end thereof accords to the cut portion and then, the volume hologram layer is transferred to the transfer-receiving member. In such an aspect, as shown in FIG. 4A, when the end of the transfer-receiving member 20 is set obliquely to the cut portion 4, a part where the cut portion 4 is not formed is broken when the volume hologram layer is transferred in the case of the cut portion 4 made of a solid line-shaped cut portion, and therefore, there is the possibility of the occurrence of breaking failures of the volume hologram layer.

However, when the cut portion 4 is formed of a unit of plural dotted line-shaped cut portions as illustrated in FIG. 4B, the breakdown of the parts where the cut portion 4 is not formed can be reduced when the volume hologram layer is transferred even in the case where the end of the transfer-receiving member 20 is set obliquely to the cut portion 4, because the adjacent cut portion lines 4 are connected with each other.

Therefore, the transferability of the volume hologram layer can be prevented from being damaged even if the accuracy of the position where the transfer-receiving member is set varies.

Here, when the aspect in which the cut portion is made in the form of plural line-shaped cut portions is an aspect in which a cut portion constituted of a unit of plural dotted line-shaped cut portions is formed, the pitches of the dotted lines of the individual cut portions formed as a unit may be the same or different.

When the cut portion is made in the form of plural line-shaped cut portions, no particular limitation is imposed to the number of line-shaped cut portions formed as a unit and the number of line-shaped cut portions may be optionally determined corresponding to, for example, the shape of a transfer-receiving member to which the volume hologram layer is transferred by using the lengthy volume hologram layer transfer foil of the present invention. When the cut portion is made in the form of plural line-shaped cut portions, the plural line-shaped cut portions formed as a unit are preferably disposed at intervals ranging from 0.1 mm to 2 mm.

Since the lengthy volume hologram layer transfer foil is formed lengthwise, plural line-shaped cut portions are usually formed on the lengthy volume hologram layer transfer foil of the present invention. At this time, no particular limitation is imposed on the aspect in which plural line-shaped cut portions are formed, and an arbitrary aspect may be used corresponding to, for example, the shape of a transfer-receiving member to which the volume hologram layer is transferred by using the lengthy volume hologram transfer foil of the present invention.

Here, when the cut portion is made in the form of plural line-shaped cut portions, the plural cut portions formed as a unit are collectively regarded as "one" cut portion.

Figure 5A:
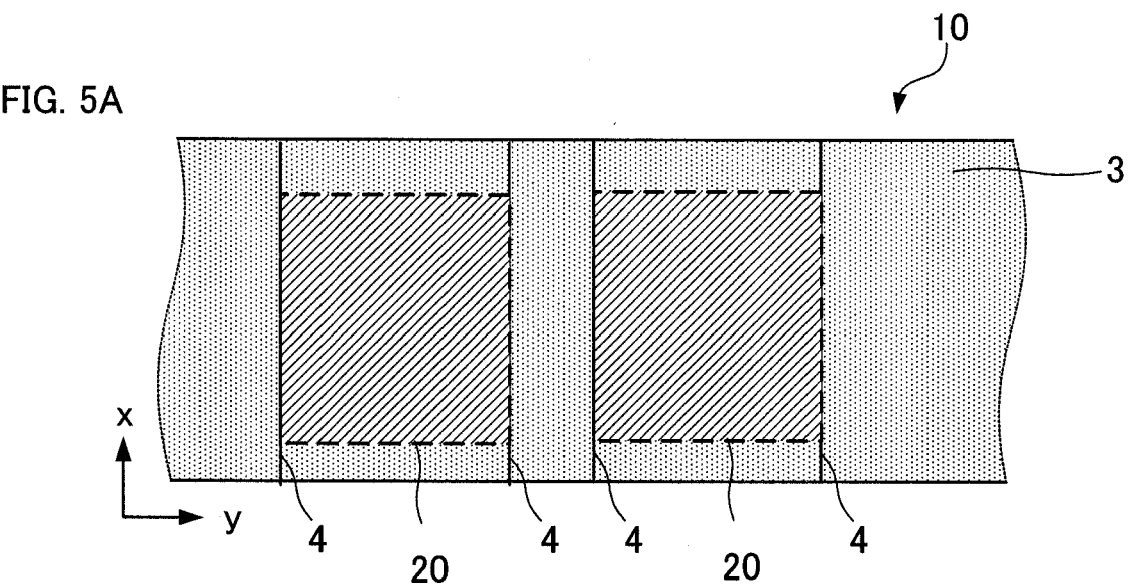
FIGS. 5A and 5B are each a schematic view showing another example of an aspect in which a cut portion is formed.
Figure 5B:
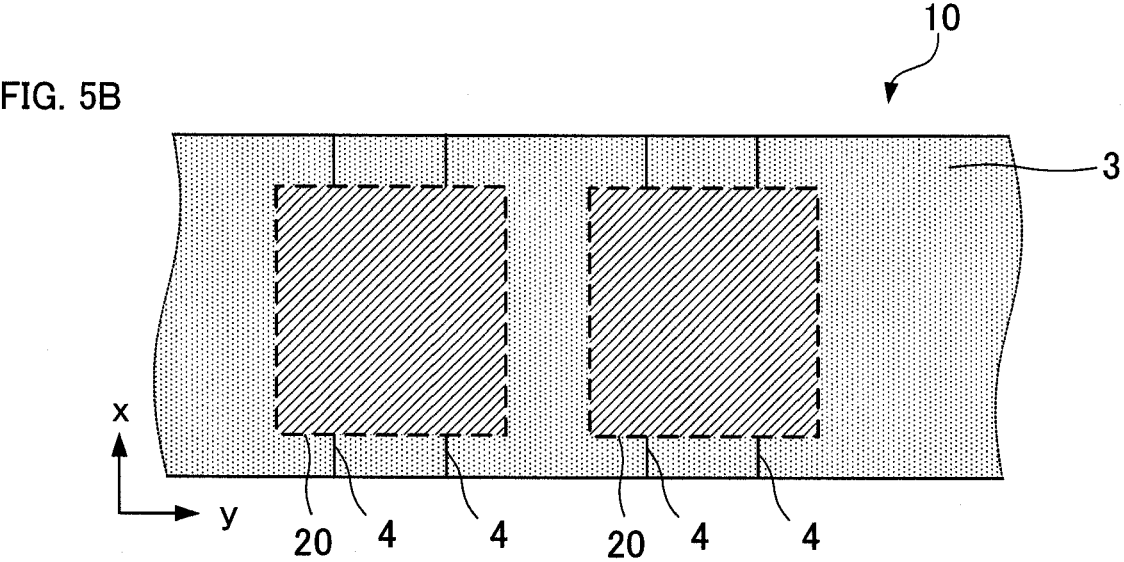

Examples of the aspect in which plural line-shaped cut portions are formed on the lengthy volume hologram layer transfer foil of the present invention may include: an aspect in which, as illustrated in FIG. 5A, the cut portion 4 is formed so as to accord to the end of the transfer-receiving member 20, which end is perpendicular to the longitudinal direction of the lengthy volume hologram layer transfer foil 10, and an aspect in which, as shown in FIG. 5B, adjacent cut portions 4 are formed at intervals shorter than the width of the transfer-receiving member 20, which width is parallel to the longitudinal direction of the lengthy volume hologram layer transfer foil 10.

In the present invention, any of these aspects is preferably used.

Figure 6:
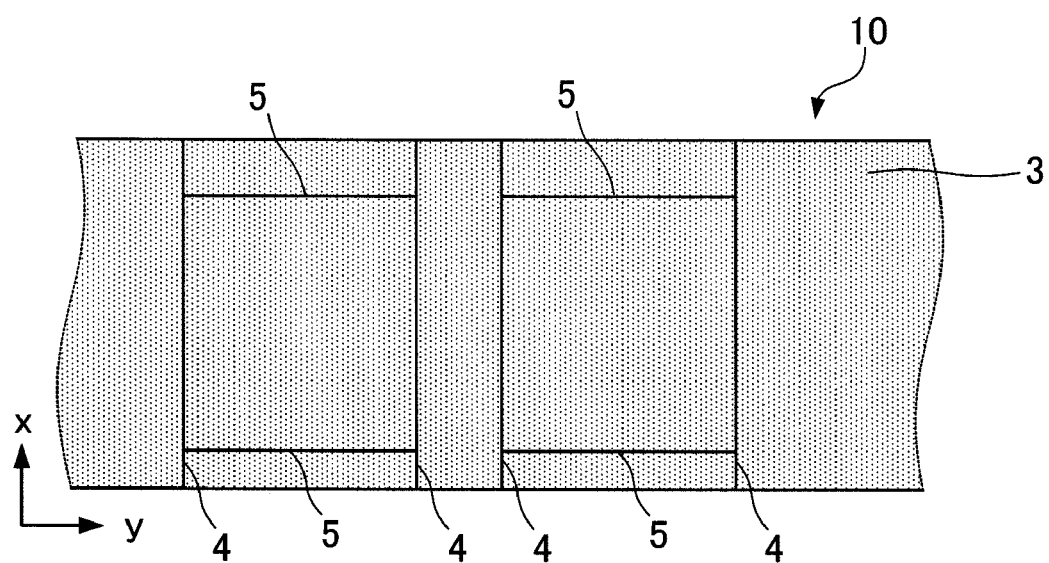
FIG. 6 is a schematic view showing a further example of an aspect in which a cut portion is formed.

The cut portion used in the present invention may be one formed in combination of other cut portions. As an example of the cut portion formed in such an aspect, an aspect may be given in which the cut portion is combined with a parallel cut portion formed in a direction parallel to the longitudinal direction of the lengthy volume hologram layer transfer foil of the present invention. As an example in which the cut portion is formed in such an aspect, an aspect may be given in which, as shown in FIG. 6, a parallel cut portion 5 is formed so as to accord to the end of a transfer-receiving member 20, the end being parallel to the longitudinal direction y of the lengthy volume hologram layer transfer foil 10.

2. Volume Hologram Layer

Next, the volume hologram layer used in the present invention will be explained. The volume hologram layer used in the present invention is one in which a volume hologram is recorded and is to be transferred to a transfer-receiving member when a volume hologram laminate is produced by using the lengthy volume hologram layer transfer foil of the present invention.

Such a volume hologram layer will be explained in detail.

(1) Structural Material

Any material may be used as the material constituting the volume hologram layer used in the present invention insofar as it can record a volume hologram, and materials used in general volume holograms may be used. Examples of such a material may include known volume hologram recording materials such as silver salt materials, gelatin bichromate emulsions, photopolymerizable resins and optical crosslinking resins. Among these materials, (i) a first photosensitive material containing a binder resin, a photopolymerizable compound, a photo polymerization initiating agent and a sensitizing dye, or (ii) a second photosensitive material containing a cationic polymerizable compound, a radically polymerizable compound, a photo radical polymerization initiator and a photo cationic polymerization initiating agent may be preferably used.

The first and second photosensitive materials will be explained step by step.

(i) First Photosensitive Material

First, the first photosensitive material will be explained. As mentioned above, the first photosensitive material contains a binder resin, a photopolymerizable compound, a photo polymerization initiating agent and a sensitizing dye.

(Binder Resin)

Examples of the binder resin may include: a poly(meth)acrylate or its partial hydrolysate; polyvinyl acetate or its hydrolysate; copolymer of a polymer component including at least one of copolymerizable monomers such as acrylic acids and acrylates, or mixtures of these copolymers; polyisoprene; polybutadiene; polychloroprene; polyvinylacetal which is a partially acetalized product of a polyvinyl alcohol; polyvinyl butyral; polyvinyl acetate; and vinyl chloride/vinyl acetate copolymer, or mixtures of these polymers. Here, when the volume hologram layer is formed, there is the case where a step of carrying out heating to move monomers to thereby stabilize the recorded volume hologram. For this, the binder resin used in the present invention preferably has a relatively low glass transition temperature and enables monomers to be easily moved.

(Photopolymerizable Compound)

As the photopolymerizable compound, photopolymerizable or optically crosslinkable monomers, oligomers or pre-polymers or mixtures of these compounds, which will be described later and each contain at least one ethylenic unsaturated bond in one molecule, may be used. Specific examples of the photopolymerizable compounds may include unsaturated carboxylic acids and their salts, esters of unsaturated carboxylic acids and aliphatic polyhydric alcohol compounds, and amide compounds of unsaturated carboxylic acids and aliphatic polyvalent amine compounds.

Here, specific examples of the unsaturated carboxylic acid monomer may include acrylic acid, methacrylic acid, itaconic acid, crotonic acid, isocrotonic acid and maleic acid. Specific examples of the monomers of esters of the aliphatic polyhydric alcohol compounds and unsaturated carboxylic acids may include, as the acrylates, ethylene glycol diacrylate, triethylene glycol diacrylate, 1,3-butanediol diacrylate, tetramethylene glycol diacrylate, propylene glycol diacrylate, neopentyl glycol diacrylate, trimethylol propane triacrylate, trimethylol propane tri(acryloyloxypropyl)ether and trimethylolethane triacrylate.

Specific examples of the monomers of the methacrylates (methacrylate ester) may include tetramethylene glycol dimethacrylate, triethylene glycol dimethacrylate, neopentyl glycol dimethacrylate, trimethylolpropane trimethacrylate and trimethylolethane trimethacrylate. Specific examples of the monomers of the itaconates (itaconic acid ester) may include ethylene glycol diitaconate, propylene glycol diitaconate and 1,3-butanediol diitaconate. Specific examples of the monomers of the crotonate (crotonic acid ester) may include ethylene glycol dicrotonate, tetramethylene glycol dicrotonate, pentaerythritol dicrotonate and sorbitol tetracrotonate. Moreover, specific examples of the monomers of isocrotonates (isocrotonic acid ester) may include ethylene glycol diisocrotonate, pentaerythritol diisocrotonate and sorbitol tetraisocrotonate. Moreover, specific examples of the monomers of maleate (estermaleate) may include ethylene glycol dimaleate, triethylene glycol dimaleate, pentaerythritol dimaleate and sorbitol tetramaleate.

Examples of the halogenated unsaturated carboxylic acid may include 2,2,3,3-tetrafluoropropylacrylate, 1H,1H,2H, 2H-heptadecafluorodecylacrylate and 2,2,3,3-tetra fluoropropylmethacrylate.

Specific examples of the monomers of amides of the unsaturated carboxylic acids and aliphatic polyvalent amine compounds may include methylene bisacrylamide, methylenebismethacrylamide, 1,6-hexamethylenebisacrylamide and 1,6-hexamethylenebismethacrylamide.

(Photo Polymerization Initiating Agent)

Examples of the photopolymerization initiating agent used in the present invention may include 1,3-di(t-butyldioxycarbonyl)benzophenone, 3,3',4,4'-tetrakis(t-butyldioxycarbonyl)benzophenone, N-phenylglycine, 2,4,6-tris(trichloromethyl)-s-triazine, 3-phenyl-5-isoxazolone, 2-mercaptobenzimidazole and imidazole dimers. Among these compounds, the photo polymerization initiating agent used in the present invention is preferably those decomposed after recording a hologram from the viewpoint of the stabilization of the recorded volume hologram. For example, an organic peroxide type is preferable because it is easily decomposed by irradiating it with ultra violet rays.

(Sensitizing Dye)

Examples of the sensitizing dye used in the present invention may include thiopyrylium salt-based dyes, merocyanine-based dyes, quinoline-based dyes, styrylquinoline-based dyes, ketocumarin-based dyes, thioxanthene-based dyes, xanthene-based dyes, oxonol-based dyes, cyanine dyes, rhodamine dyes, thiopyrylium salt-based dyes, pyrylium ion-based dyes and diphenyliodonium-based dyes.

(ii) Second Photosensitive Material

Next, the second photosensitive material used in the present invention will be explained. As mentioned above, the second photosensitive material contains a cationic polymerizable compound, a radically polymerizable compound, photo radical polymerization initiator and a cationic polymerization initiating agent.

Here, as a method for recording a volume hologram in the volume hologram layer, when such a second photosensitive material is used, a method is used in which laser light that sensitizes the photo radical polymerization initiator is applied and then light having a wavelength different from that of the laser light by which the photo cationic polymerization initiating agent is sensitized is applied.

(Cationic Polymerizable Compound)

As the cationic polymerizable compound, those having a liquid state at room temperature are preferably used from the point that the polymerization of a radically polymerizable compound is preferably carried out in a composition having a relatively low viscosity. Examples of the cationic polymerizable compound may include diglycerol diether, pentaerythritol polyglycidyl ether, 1,4-bis(2,3-epoxypropoxyperfluoroisopropyl)cyclohexane, sorbitol polyglycidyl ether, 1,6-hexanediol glycidyl ether, polyethylene glycol diglycidyl ether and phenyl glycidyl ether.

(Radically Polymerizable Compound)

As the radically polymerizable compound, those having at least one ethylenic unsaturated double bond in a molecule are preferable. The average refractive index of the radically polymerizable compound used in the present invention is preferably larger than that of the cationic polymerizable compound and is more preferably larger by 0.02 or more. This is because a volume hologram is formed by a difference in refractive index between the radically polymerizable compound and the cationic polymerizable compound, and that, therefore, when the difference in average refractive index is lower than the value mentioned above, the modulation of the refractive index is insufficient. Examples of the radically polymerizable compound used in the present invention may include acrylamide, methacrylamide, styrene, 2-bromostyrene, phenylacrylate, 2-phenoxyethylacrylate, 2,3-naphthalenedicarboxylic acid (acryloxyethyl) monoester, methylphenoxyethylacrylate, nonylphenoxyethylacrylate and β-acryloxyethylhydrogen phthalate.

(Photo Radical Polymerization Initiator)

Any material may be used as the photo radical polymerization initiator to be used in the present invention without any particular limitation as long as it can produce active radicals by the first exposure when the volume hologram is recorded and the active radicals can polymerize the radically polymerizable compound. The photo radical polymerization initiator may be used in combination with a sensitizer which is generally a component absorbing light, an active radical generating compound and an acid generating compound. Though there is the case where a colored compound such as a dye as the photo radical polymerization initiator to absorb visible laser light, a cyanine dye is preferably used when a color less transparent hologram is to be produced. This is because cyanine-based dyes are easily decomposed by light, the dye in the hologram is decomposed by the post-exposure or by allowing the hologram to stand under room light or sunlight for several hours to several days, so that it has no absorption in the visible range, whereby a color less transparent volume hologram can be obtained.

Specific examples of the cyanine-based dye include anhydro-3,3'-dicarboxymethyl-9-ethyl-2,2'-thiacarbocyaninebetaine, anhydro-3-carboxymethyl-3',9'-diethyl-2,2'-thiacarbocyaninebetaine, 3,3',9-triethyl-2,2'-thiacarbocyanine.iodine salt, 3,9-diethyl-3'-carboxymethyl-2,2'-thiacarbocyanine.iodine salt, 3,3',9-triethyl-2,2'-(4,5,4',5'-dibenzo)thiacarbocyanine.iodine salt, 2-[3-(3-ethyl-2-benzothiazolidene)-1-propenyl]-6-[2-(3-ethy1-2-benzothiazolidene)ethylideneimino]-3-ethyl-1,3,5-thiadiazolium.iodine salt, 2-[[3-allyl-4-oxo-5-(3-n-propyl-5,6-dimethyl-2-benzothiazolidene)-ethylidene-2-thiazolinylidene]methyl]3-ethyl-4,5-diphenylthiazolinium.iodine salt, 1,1'1,3,3,3',3'-hexamethyl-2,2'-indotricarbocyanine.iodine salt, 3,3'1-diethyl-2,2'-thiatricarbocyanine.perchlorate, anhydro-1-ethyl-4-methoxy-3'-carboxymethyl-5'-chloro-2,2'-quinothiacyaninebetaine, anhydro-5,5'-diphenyl-9-ethyl-3,3'-disulfopropyloxacarbocyaninehydroxide.triethylamine salt. These compounds may be used either singly or in combinations of two or more.

Examples of the active radical generating compound include diaryliodonium salts and 2,4,6-substituted-1,3,5-triazines. It is particularly preferable to use diaryliodonium salts when high photosensitivity is necessary. Specific examples of the diaryliodonium salts include chlorides, bromides, tetrafluoroborates, hexa fluorophosphates, hexafluoroarsenates, hexa fluoroantimonates, trifluoromethanesulfonates and 9,10-dimethoxyanthracene-2-sulfonates of diphenyl iodonium, 4,4'-dichlorodiphenyl iodonium, 4,4'-dimethoxydiphenyliodoniium, 4,4'-ditertiarybutyldiphenyliodonium, 3,3'-dinitrodiphenyliodonium and the like. Specific examples of 2,4,6-substituted-1,3,5-triazines include 2-methyl-4,6-bis(trichloromethyl)-1,3,5-triazine, 2,4,6-tris(trichloromethyl)-1,3,5-triazine, 2-phenyl-4,6-bis(trichloromethyl)1,3,5-triazine, 2,4-bis(trichloromethyl)-6-(p-methoxyphenylvinyl)-1,3,5-tri azine and 2-(4'-methoxy-1'-naphthyl)-4,6-bis(trichloromethyl)-1,3,5-triazine.

(Photo Cationic Polymerization Initiating Agent)

Any material may be used as the photo cationic polymerization initiating agent used in the present invention without any particular limitation insofar as it is a polymerization initiator that has low sensitivity to light of the first exposure when the volume hologram is recorded and is sensitized by light of the after-exposure applying light having a wavelength different from that of the first exposure to generate a BrØnsted acid or a Lewis acid to thereby polymerize the cationic polymerizable compound. In particular, it is preferable to use a polymerization initiator which does not polymerize the cationic polymerizable compound during the first exposure. Examples of the photo cationic polymerization initiating agent include diaryliodonium salts, triarylsulfonium salts and iron allene complexes. Preferable examples of the diaryliodonium salts include tetra fluoroborate, hexa fluorophosphate, hexafluoroarsenate and hexafluoroantimonate of iodonium shown as examples of the photo radical polymerization initiator mentioned above. Preferable examples of the triarylsulfonium salts include triphenylsulfonium and 4-tertiary butyl-triphenylsulfonium.

(Others)

In the second photosensitive material, a binder resin, thermal polymerization preventive, silane coupling agent, plasticizer and colorants may be combined according to the need. The binder resin is used to improve the film-forming ability of the composition before a hologram is formed and to improve the uniformity of film thickness, and to ensure stable existence of interference fringes formed by the polymerization when light such as laser light is applied until post-exposure is carried out. As the binder resin, any binder resin may be used insofar as it is highly compatible with cationic polymerizable compounds and radically polymerizable compounds. Examples of the binder resin include chlorinated polyethylene, polymethylmethacrylate, copolymers of methylmethacrylate and other alkyl(meth)acrylates, copolymers of vinyl chloride and acrylonitrile, and polyvinyl acrylates. The binder resin may contain a reactive group such as a cationic polymerizable group at its side chain or principal chain.

(2) Others

No particular limitation is imposed on the thickness of the volume hologram layer insofar as it is within a range where a prescribed volume hologram layer is formed, and may be optionally adjusted corresponding to the type of the structural material. Particularly, the thickness of the volume hologram layer used in the present invention is preferably in a range of 1 μm to 50 μm and more preferably in a range of 3 μm to 25 μm.

Since the cut portion is formed so as to cut at least a part of the volume hologram layer, a volume hologram layer improved in transfer characteristics can be obtained regardless of thickness.

3. Heat Seal Layer

Next, the heat seal layer used in the present invention will be explained. The heat seal layer used in the present invention contains a thermoplastic resin and has the function to bind the volume hologram layer with a transfer-receiving member in the case of producing the volume hologram laminate by using the lengthy volume hologram layer transfer foil of the present invention.

The heat seal layer used in the present invention will be explained in detail.

There is no particular limitation to the thermoplastic resin to be used in the present invention insofar as it can bind the volume hologram layer with a transfer-receiving member corresponding to the type of transfer-receiving member to which the volume hologram layer is transferred from the lengthy volume hologram layer transfer foil of the present invention. Examples of the thermoplastic resin may include an ethylene/vinyl acetate copolymer resin, vinyl chloride/vinyl acetate copolymer resin, polyamide resin, polyester resin, polyethylene resin, ethylene/isobutylacrylate copolymer resin, butyral resin, polyvinyl acetate resin and its copolymer resin, ionomer resin, acid-modified polyolefin-based resin, (meth)acryl-based resin such as an acryl-based/methacryl-based resin, acrylate-based resin, ethylene/(meth)acrylic acid copolymer, ethylene/(meth)acrylate copolymer resin, polymethylmethacrylate-based resin, cellulose-based resin, polyvinyl ether-based resin, polyurethane resin, polycarbonate resin, polypropylene resin, epoxy resin, phenol resin, vinyl-based resin, maleic acid resin, alkyd resin, polyethylene oxide resin, urea resin, melamine resin, melamine/alkyd resin, silicone resin, rubber-based resin, styrene/butadiene/styrene block copolymer (SBS), styrene/isoprene/styrene block copolymer (SIS), styrene/ethylene/butylene/styrene block copolymer (SEBS) and styrene/ethylene/propylene/styrene block copolymer (SEPS). In the present invention, any of these thermoplastic resins can be preferably used.

These thermoplastic resins may be used either singly or in combinations of two or more.

The heat seal layer used in the present invention may contain additives other than the thermoplastic resin. Examples of these additives used in the present invention may include a dispersant, filler, plasticizer and antistatic agent.

The thickness of the heat seal layer used in the present invention is preferably usually in a range of 1 μm to 50 μm and more preferably in a range of 1 μm to 25 μm though there is no particular limitation thereto and it is properly selected according to the type of volume hologram layer transfer foil and the like and to the type of transfer-receiving member to which the volume hologram layer is transferred by using the lengthy volume hologram layer transfer foil of the present invention. This is because there is the possibility of insufficient adhesive properties between the volume hologram layer and the transfer-receiving member when the thickness is less than the above range. This is also because when the thickness exceeds the above range, the temperature of the heat seal layer to be heated becomes too high when the volume hologram layer is transferred from the lengthy volume hologram layer transfer foil of the present invention and therefore, there is the possibility of the occurrence of damages to the substrate and the like.

The heat seal layer is formed with a cut portion in such a manner as to penetrate therethrough in the direction of the thickness thereof or with a pre-forgery preventive cut portion which will be described later in the paragraph "6. Pre-forgery preventive cut portion" according to the need.

4. Substrate

Next, the substrate used in the present invention will be explained. The substrate used in the present invention has the function to support the aforementioned volume hologram layer and heat seal layer.

No particular limitation is imposed on the substrate used in the present invention insofar as it can support the aforementioned volume hologram layer and heat seal layer. Specific examples of the substrate may include a polyethylene film, polypropylene film, polyethylene fluoride-based film, polyvinylidene fluoride film, polyvinyl chloride film, polyvinylidene chloride film, ethylene/vinyl alcohol copolymer film, polyvinyl alcohol film, polymethylmethacrylate film, polyether sulfone film, polyether ether ketone film, polyamide film, tetra fluoroethylene/perfluoroalkylvinyl ether copolymer film and polyester film such as a polyethylene terephthalate film and resin film such as a polyimide film.

The thickness of the substrate used in the present invention is usually in a range of 2 μm to 200 μm and preferably in a range of 10 μm to 50 μm, though it is properly selected corresponding to factors such as the use and type of the volume hologram laminate produced in the present invention.

5. Other Layers

The lengthy volume hologram layer transfer foil of the present invention is provided with at least the substrate, volume hologram layer and heat seal layer and formed with the cut portion. In the present invention, layers other than the above structural parts may be used according to the need. No particular limitation is imposed on these other layers used in the present invention and these layers may be properly selected according to the use of the volume hologram laminate produced using the lengthy volume hologram layer transfer foil of the present invention. Among these other layers, a peelable over protection layer formed between the substrate and the volume hologram layer may be given as examples of these other layers.

Figure 7:
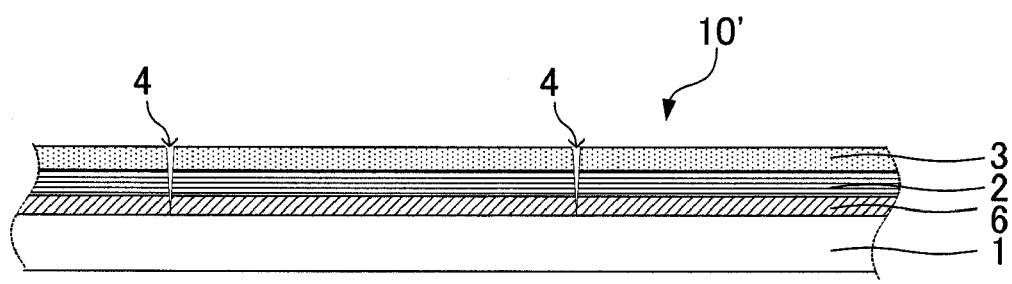
FIG. 7 is a schematic sectional view showing another example of a lengthy volume hologram layer transfer foil according to the present invention.

The case where the peelable over protection layer is used in the lengthy volume hologram layer transfer foil will be explained with reference to the drawings. FIG. 7 is a schematic sectional view showing an example using the peelable over protection layer in the lengthy volume hologram layer transfer foil of the present invention. As illustrated in FIG. 7, the lengthy volume hologram layer transfer foil 10' may be provided with a peelable overprotection layer 6 formed between a substrate 1 and a volume hologram layer 2.

When the peelable over protection layer is used in the lengthy volume hologram transfer foil of the present invention, advantageous effects are obtained in the following two points.

First, the use of the peelable over protection layer ensures that the binding force between the substrate and the volume hologram layer can be adjusted to a desired range. Therefore, when the volume hologram layer is transferred from the lengthy volume hologram layer transfer foil of the present invention, the ability to peel off the volume hologram layer from the substrate can be improved.

Second, the use of the peelable over protection layer ensures that the surface of the volume hologram layer can be covered with the peelable over protection layer when the volume hologram layer is transferred to a transfer-receiving member by using the lengthy volume hologram transfer foil of the present invention and therefore, the transferred volume hologram layer can be protected.

In FIG. 7, an example is given in which the cut portion is formed so as to cut the peelable over protection layer. However, the aspect using the peelable over protection layer in the present invention is not limited to an aspect like this and, for example, the cut portion may be formed so as not to cut the peelable over protection layer.

Examples of the material used for the peelable over protection layer used in the present invention may include acryl-based or methacryl-based resins such as polymethylacrylates and polymethylmethacrylates, polyvinyl chloride resins, cellulose resins, silicone resins, chlorinated rubber, casein, various surfactants and metal oxides, which may be used either singly or in combinations of two or more.

Examples of layers other than the peelable over protection layer to be used in the present invention may include a primer layer used to improve the adhesion between the volume hologram layer and the heat seal layer or between the volume hologram layer and the peelable over protection layer. Examples of the primer layer may include those using a polyurethane, polyester, polyvinyl chloride-based resin, polyvinyl acetate-based resin, vinyl chloride/vinyl acetate copolymer, acryl resin, polyvinyl alcohol-based resin, polyvinyl acetal resin, copolymer of ethylene and vinyl acetate or an acrylic acid and epoxy resin.

As the other layer in the present invention, a barrier layer may be formed between the volume hologram layer and the heat seal layer. The reason is as follows. Specifically, a movement of low molecular weight components from the volume hologram layer to other layers is made with time depending on the combination of the photosensitive material used in the volume hologram layer and the thermoplastic resin used in the heat seal layer, and there is the case where this causes the transfer of the regenerated wavelength of the volume hologram recorded in the volume hologram layer to the blue side (shorter wavelength side). However, when the barrier layer is formed, this problem can be solved.

Any material may be used as the material used for the barrier layer without any particular limitation insofar as it can develop desired barrier characteristics. However, transparent organic resin materials are usually used as the material for the barrier layer. Examples of the transparent organic resin material to be used in the present invention may include non-solvent-based tri- or higher functional and preferably hexa- or higher functional ionizing radiation-curable epoxy-modified acrylate resins, urethane-modified acrylate resins and acryl-modified polyester resins which are reactive to ionizing radiation such as ultra violet rays or electron rays.

6. Pre-Forgery Preventive Cut Portion

The lengthy volume hologram layer transfer foil of the present invention may be provided with a pre-forgery preventive cut portion according to the need. The pre-forgery preventive cut portion used in the lengthy volume hologram layer transfer foil of the present invention is characterized by the structure in which it is formed on a part of the transfer part which is the part to be transferred to the transfer-receiving member side in such a manner as to penetrate through the heat seal layer and to cut at least a part of the volume hologram layer. The pre-forgery preventive cut portion used in the present invention is transferred together with a part (hereinafter, referred to as a transfer portion) of the transfer part which is the part to be transferred when the lengthy volume hologram layer transfer foil is transferred to the transfer-receiving member to constitute the forgery preventive cut portion which will be described later in the paragraphs "B. Volume hologram laminate", "3. Forgery preventive cut portion". Specifically, the volume hologram laminate produced by transferring the lengthy volume hologram layer transfer foil of the present invention to the transfer-receiving member is eventually provided with the forgery preventive cut portion. This results in that when it is intended to peel the volume hologram layer from the volume hologram laminate, the volume hologram layer is easily broken at the forgery preventive cut portion as the starting point, whereby a forgery preventive effect can be obtained.

The following explanations will be furnished as to the case where the pre-forgery preventive cut portion is used in the lengthy volume hologram layer transfer foil of the present invention.

The pre-forgery preventive cut portion in the present invention is formed on a part of the transfer part which is the part to be transferred when the lengthy volume hologram layer transfer foil is transferred to the transfer-receiving member side, so as to penetrate through the heat seal layer and to cut at least a part of the volume hologram layer. When the pre-forgery preventive cut portion is formed, the forgery preventive cut portion (because the volume hologram layer is peeled from the transfer foil, the pre-forgery preventive cut portion constitutes the forgery preventive cut portion) makes it difficult to peel the volume hologram layer as a continuum when it is intended to peel the volume hologram layer of the volume hologram laminate which will be explained later. Specifically, when it is intended to peel the volume hologram layer as it stands, the forgery preventive cut portion constitutes the original point from which the volume hologram layer is broken, so that it is difficult to reapply the transfer foil, whereby a forgery preventive effect can be obtained.

The aspect in which the pre-forgery preventive cut portion of the lengthy volume hologram layer transfer foil according to the present invention is formed will be explained by dividing it into a structure viewed from the direction of the thickness and a structure viewed from the in-plane direction.

In the case of setting the direction of the thickness as a standard, the pre-forgery preventive cut portion in the present invention is formed in such a manner as to penetrate through the heat seal layer and to cut at least a part of the volume hologram layer. In the present invention, no particular limitation is imposed on the aspect in which the pre-forgery preventive cut portion is formed in the direction of the thickness insofar as it is an aspect in which the pre-forgery preventive cut portion is formed such that, upon transfer, it starts from the surface of the heat seal layer, penetrates through the heat seal layer and cuts at least a part of the volume hologram layer. In the present invention, particularly, at least $1/3$ or more and preferably $1/2$ or more of the volume hologram layer is cut. Moreover, it is most preferable that in the present invention, the pre-forgery preventive cut portion is preferably formed so as to cut the volume hologram layer completely. When the pre-forgery preventive cut portion is formed in this manner, the volume hologram layer is broken at the forgery preventive cut portion as the original point when it is intended to peel the volume hologram layer of the volume hologram laminate which will be described later, whereby a forgery preventive effect can be obtained.

When other layers are used between the aforementioned substrate and volume hologram layer in the lengthy volume hologram layer transfer foil of the present invention, the pre-forgery preventive cut portion may be formed so as to cut or not to cut these other layers. When the pre-forgery preventive cut portion is formed so as to cut these other layers, the aspect of the pre-forgery preventive cut portion may be an aspect in which the notch precursor is formed so as to cut either only at least one part of the other layers or to cut these other layers completely.

More specifically, as mentioned above, the lengthy volume hologram layer transfer foil of the present invention is preferably provided with a peelable over protection layer formed between the substrate and the volume hologram layer. In this case, the aspect in which the pre-forgery preventive cut portion is formed may be an aspect in which at least a part or the entire peelable over protection layer is cut or an aspect in which the peelable over protection layer is not cut at all.

Although the pre-forgery preventive cut portion in the present invention may be formed so as to cut a part of the substrate, it is preferably formed so as not to cut the substrate. The lengthy volume hologram layer transfer foil of the present invention is preferably used to produce the volume hologram laminate by transferring the volume hologram layer continuously. Therefore, if the pre-forgery preventive cut portion is formed on a part of the substrate, the substrate is broken when the volume hologram layer is transferred, and therefore, there is the possibility that the continuous transfer of the volume hologram layer is difficult.

Figure 8A:
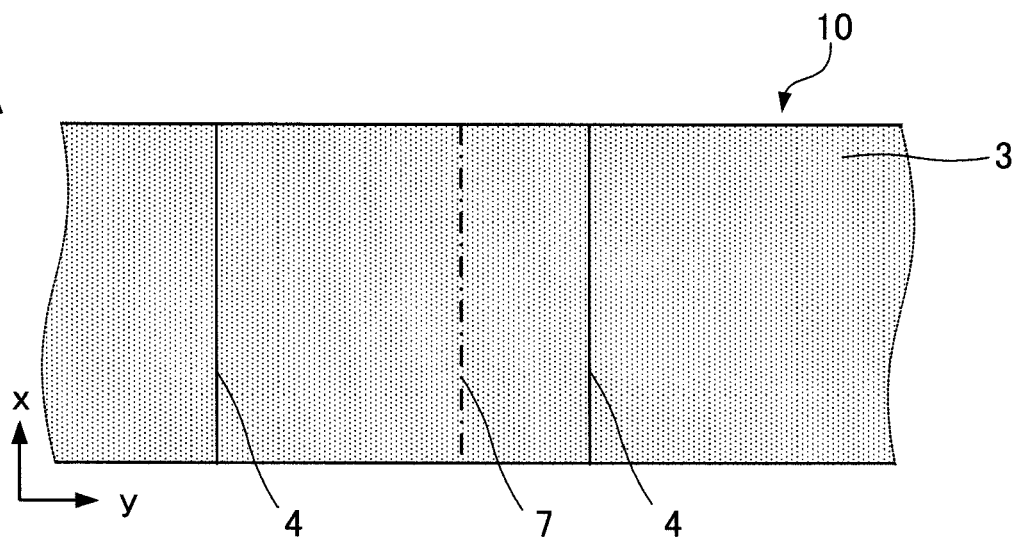
FIGS. 8A to 8C are each a schematic view showing an example of an aspect in which a pre-forgery preventive cut portion is formed.
Figure 8B:
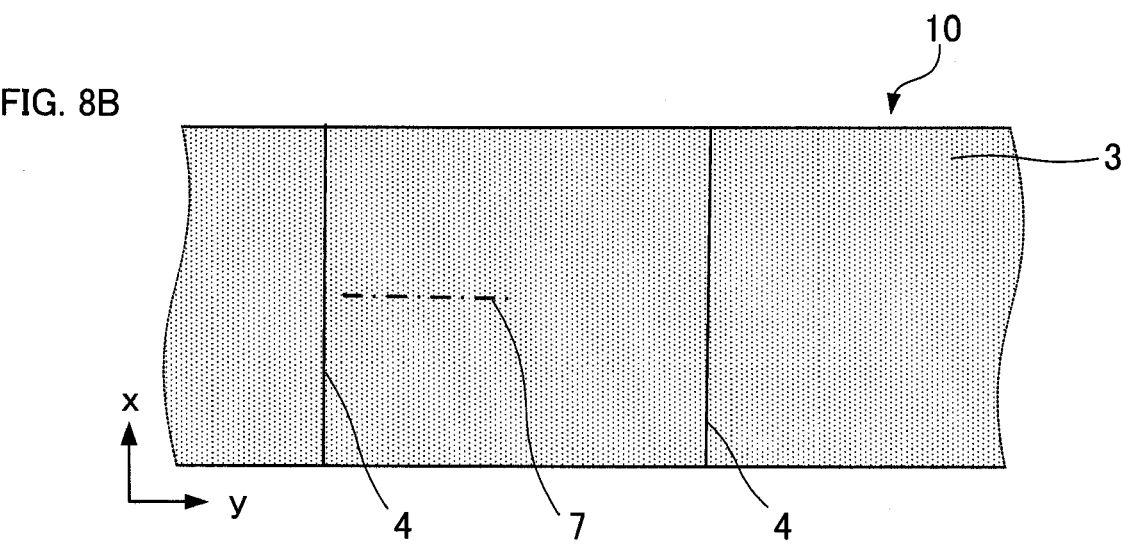
Figure 8C:
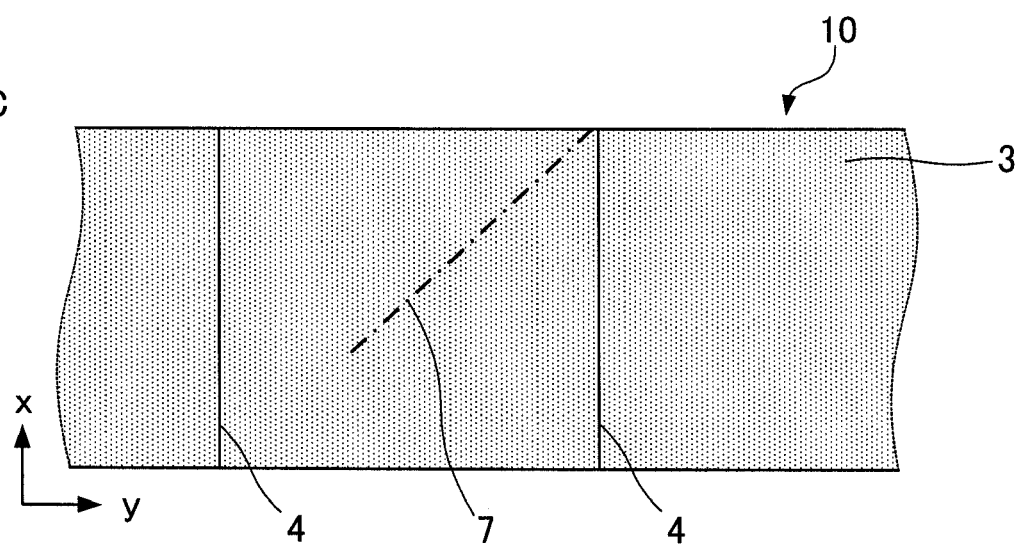

Next, the aspect in which the pre-forgery preventive cut portion is formed in the in-plane direction of the lengthy volume hologram layer transfer foil of the present invention will be explained. In the case of setting the in-plane direction as a standard, there is no particular limitation to the pre-forgery preventive cut portion in the present invention insofar as an aspect in which the volume hologram layer is cut by the pre-forgery preventive cut portion is adopted when it is intended to peel the volume hologram layer of the volume hologram laminate which will be explained later. Therefore, examples of this aspect may include: an aspect in which as illustrated in FIG. 8A, the pre-forgery preventive cut portion 7 is formed over the full width of the lengthy volume hologram layer transfer foil 10 of the present invention; an aspect in which as illustrated in FIG. 8B, the pre-forgery preventive cut portion 7 is formed in the longitudinal direction of the lengthy volume hologram layer transfer foil 10 of the present invention so as not to reach the cut portion 4; and an aspect in which as illustrated in FIG. 8C, the pre-forgery preventive cut portion 7 is formed in the direction of the diagonal line of the transfer portion in the lengthy volume hologram layer transfer foil 10 in such a manner as to include one end of the both ends of the diagonal line. In the present invention, no particular limitation is imposed on the position at which the pre-forgery preventive cut portion is formed in the in-plane direction. However, the position is preferably the end of the transfer portion of the lengthy volume hologram layer transfer foil of the present invention. This is because if the cut portion is formed at the end of the transfer portion, a forgery preventive effect can be obtained without impairing the visibility of image information.

Figure 9A:
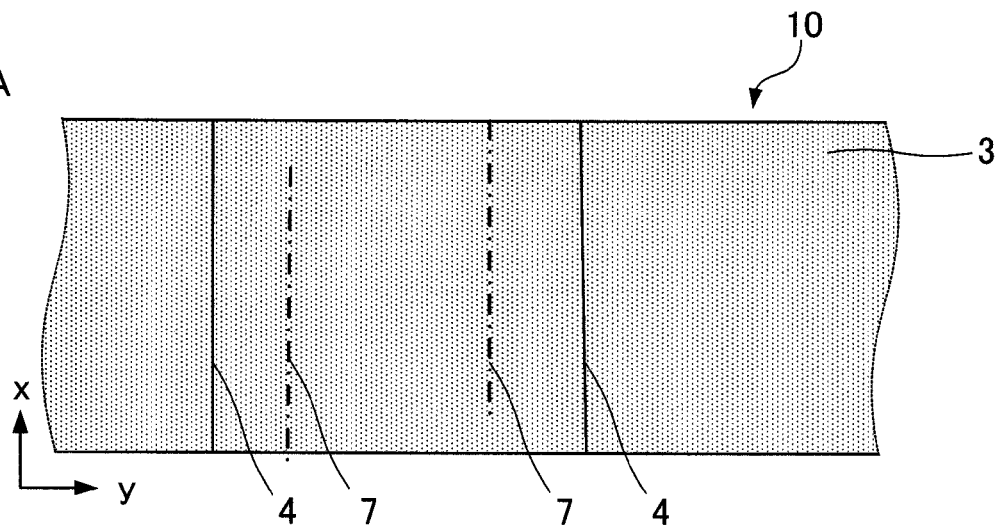
FIGS. 9A to 9C are each a schematic view showing another example of an aspect in which a pre-forgery preventive cut portion is formed.
Figure 9B:
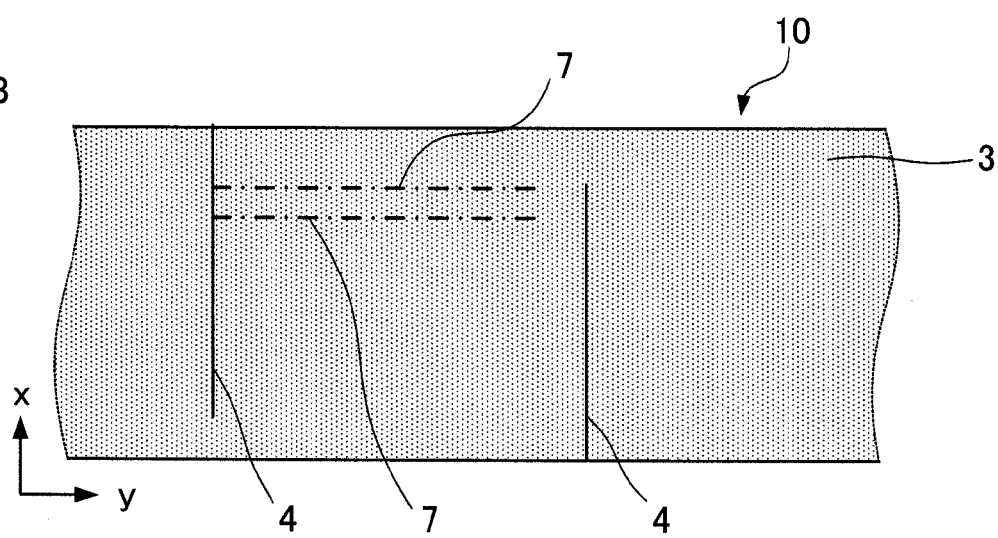
Figure 9C:
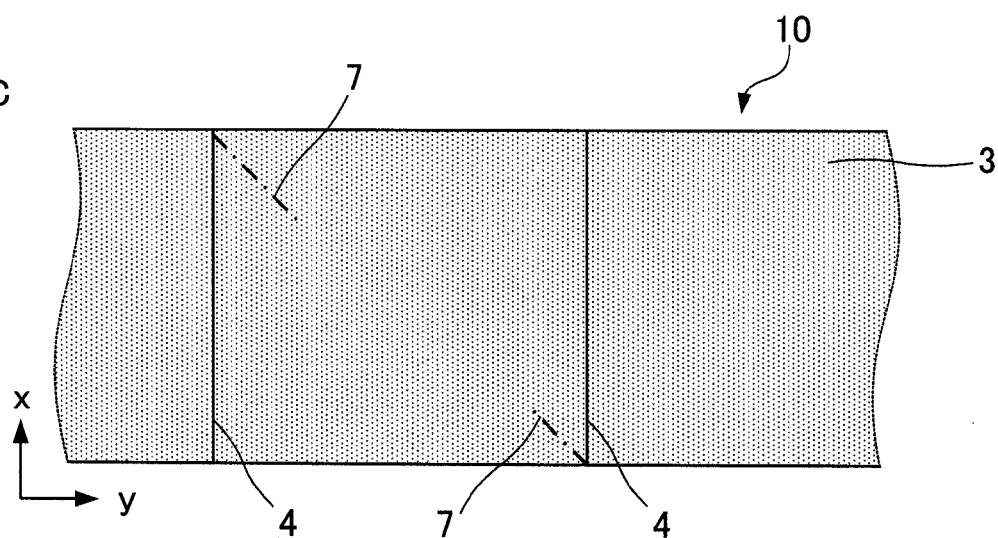
Figure 10A:
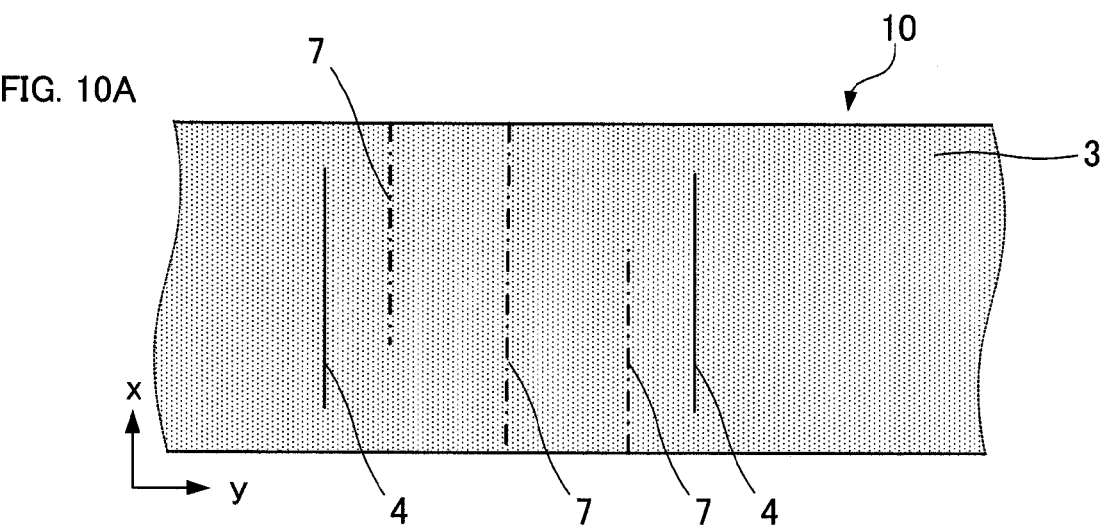
FIGS. 10A to 10C are each a schematic view showing a further example of an aspect in which a pre-forgery preventive cut portion is formed.
Figure 10B:
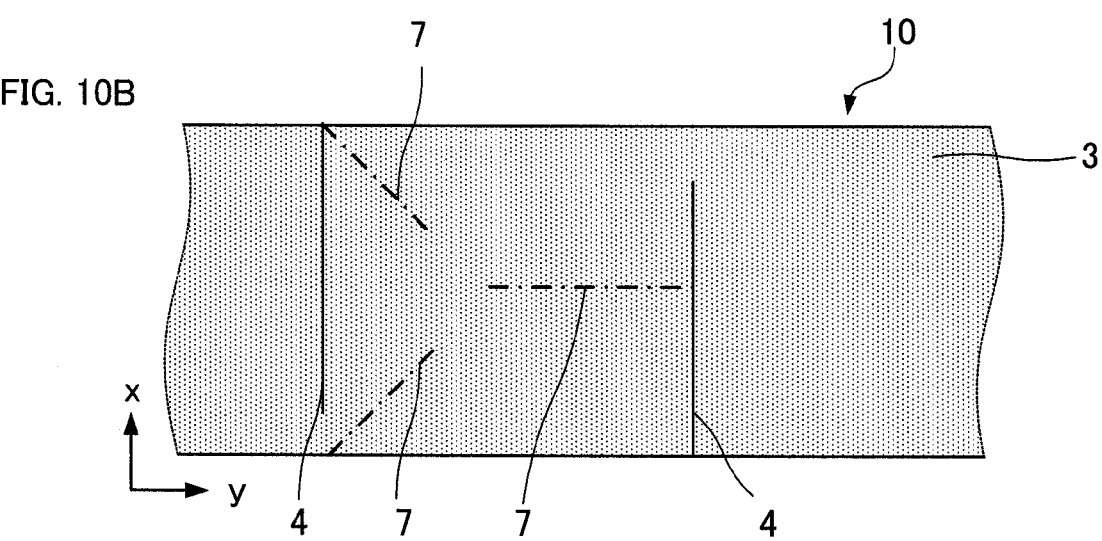
Figure 10C:
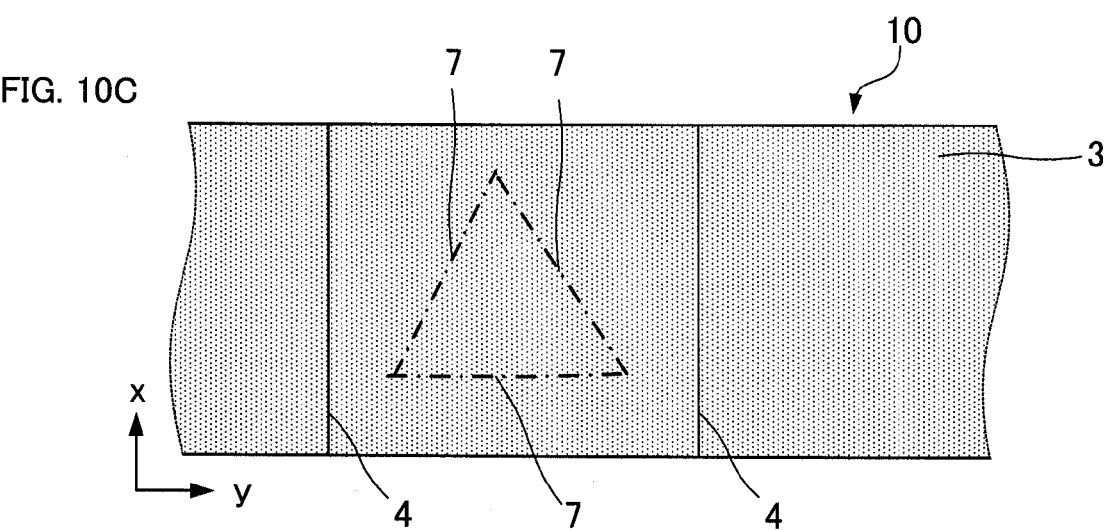
Figure 11A:
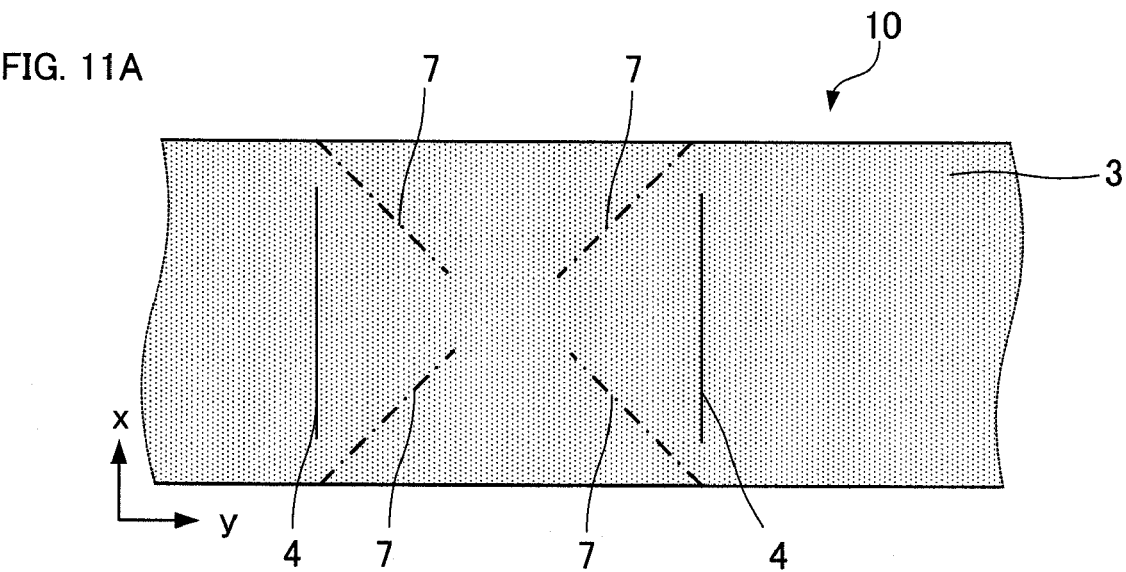
FIGS. 11A to 11B are each a schematic view showing a further example of an aspect in which a pre-forgery preventive cut portion is formed.
Figure 11B:
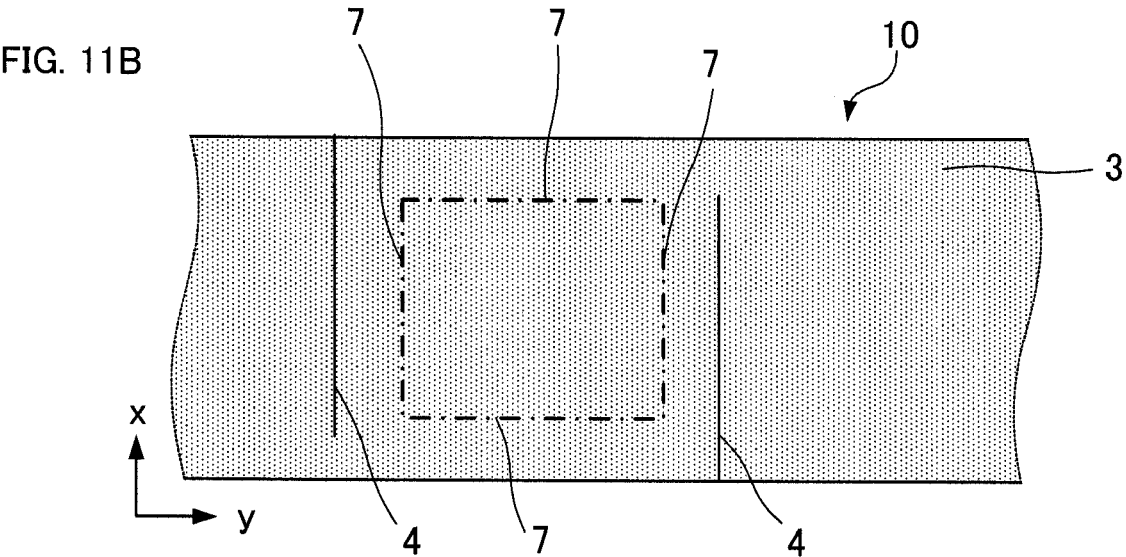

Plural pre-forgery preventive cut portion s may be formed in the lengthy volume hologram layer transfer foil of the present invention. At this time, no particular limitation is imposed on the aspect in which plural pre-forgery preventive cut portions are formed and an optional aspect may be used according to, for example, the shape of a transfer-receiving member to which the volume hologram layer is transferred by using the lengthy volume hologram layer transfer foil of the present invention. Examples of the aspect may include: an aspect in which as illustrated in FIG. 9A, two pre-forgery preventive cut portions 7 are lined in parallel to each other in the direction of the full width of the lengthy volume hologram layer transfer foil 7 of the present invention; an aspect in which as illustrated in FIG. 9B, two pre-forgery preventive cut portions 7 are lined in parallel to each other in the longitudinal direction of the lengthy volume hologram layer transfer foil 10 of the present invention; and an aspect in which as illustrated in FIG. 9C, two pre-forgery preventive cut portions 7 are disposed opposite to each other in the diagonal direction of the transfer portion of the lengthy volume hologram layer transfer foil 10 of the present invention. When three pre-forgery preventive cut portions are formed, examples of the aspect may include: an aspect in which as illustrated in FIG. 10A, three pre-forgery preventive cut portions 7 are lined in parallel to each other in the direction of the full width of the lengthy volume hologram layer transfer foil 10 of the present invention; an aspect in which as illustrated in FIG. 10B, two pre-forgery preventive cut portions 7 are formed in the directions of the diagonal lines of the transfer portion and one pre-forgery preventive cut portion is formed in the longitudinal direction of the lengthy volume hologram layer transfer foil 10 of the present invention; and an aspect in which as illustrated in FIG. 10C, three pre-forgery preventive cut portions 7 are disposed so as to form a triangle. Moreover, when four pre-forgery preventive cut portions are formed, an aspect in which, as illustrated in FIG. 11A, four pre-forgery preventive cut portions 7 are formed opposite to each other in the directions of the diagonal lines of the transfer portion; and an aspect in which as illustrated in FIG. 11B, four pre-forgery preventive cut portions 7 are formed so as to form a rectangle are given as examples. In the present invention, any of these aspects may be preferably used.

Here, when the pre-forgery preventive cut portion is made in the form of plural line-shaped cut portions, the plural pre-forgery preventive cut portions integrally formed as a unit are collectively regarded as "one" pre-forgery preventive cut portion.

The pre-forgery preventive cut portion used in the present invention may be formed in combination with other cut portions. Examples of the aspect in which the pre-forgery preventive cut portion is formed in such a manner may include an aspect in which the pre-forgery preventive cut portion is combined with a parallel cut portion 5 formed in the direction parallel to the longitudinal direction of the lengthy volume hologram layer transfer foil of the present invention shown in FIG. 6 as mentioned above in the paragraph "1. Cut portion, (2) Aspect of the formation in the in-plane direction".

Moreover, aspects in which the pre-forgery preventive cut portion is made in the form of a linear line, curved line or bend line may be given as examples. These aspects are, however, the same as those described in the above paragraph "1. Cut portion, (2) Aspect of the formation in the in-plane direction", and therefore, explanations of these aspects are omitted here.

No particular limitation is imposed on the method of forming the pre-forgery preventive cut portion, and the pre-forgery preventive cut portion may be formed using the same method as that used to form the cut portion as described in the paragraph "8. Method of producing a lengthy volume hologram layer transfer foil" which will be explained later.

7. Lengthy Volume Hologram Layer Transfer Foil

The lengthy volume hologram layer transfer foil of the present invention is formed length-wise. Here, "lengthy" in the present invention means that the ratio of the distance in the longitudinal direction to the distance in a direction perpendicular to the longitudinal direction, namely (distance in the longitudinal direction/distance in a direction perpendicular to the longitudinal direction) is 5 or more.

8. Method of Producing a Lengthy Volume Hologram Layer Transfer Foil

The lengthy volume hologram layer transfer foil may be produced by forming the cut portion after laminating the volume hologram layer and the heat seal layer in this order on the lengthy substrate. Here, there is no particular limitation to the method of forming the cut portion and the cut portion may be formed by making a cut from the heat seal side by using an optional cutting means.

B. Volume Hologram Laminate

Next, the volume hologram laminate of the present invention will be explained. The volume hologram laminate of the present invention is one provided with a transfer-receiving member, a heat seal layer formed on the transfer-receiving member and a volume hologram layer formed on the heat seal layer, and also, with a forgery preventive cut portion formed so as to penetrate through the heat seal layer and to at least a part of the volume hologram layer.

Figure 12A:
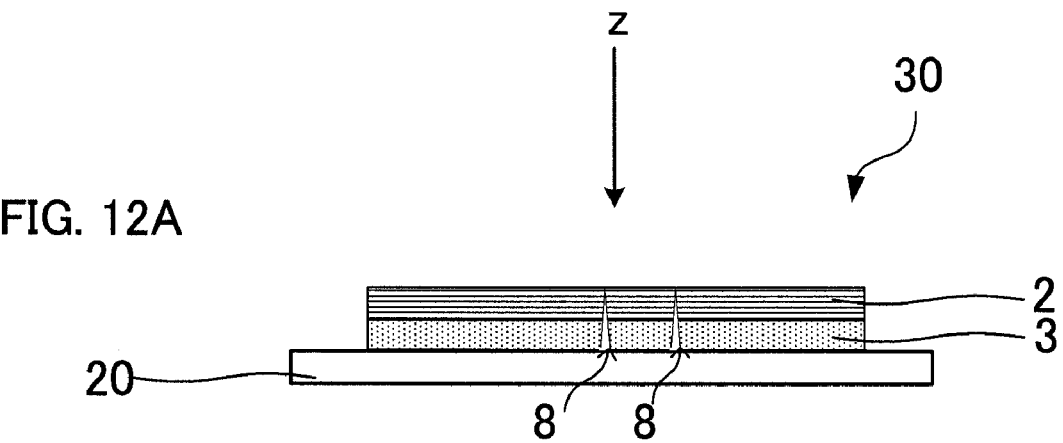
FIGS. 12A and 12B are each a schematic view showing an example of a volume hologram laminate according to the present invention.
Figure 12B:
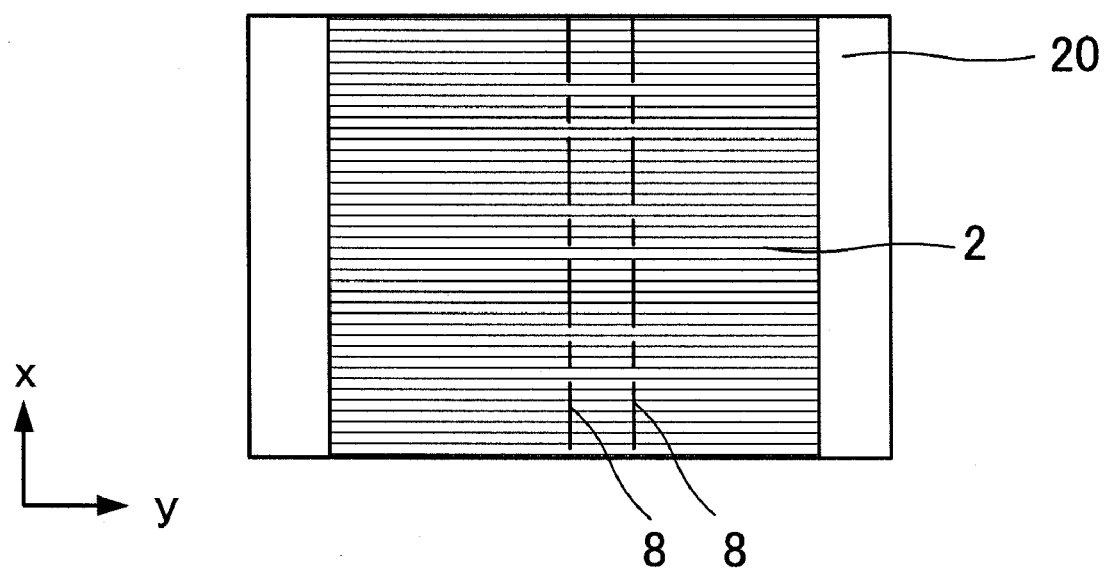

The volume hologram laminate of the present invention as mentioned above will be explained with reference to the drawings. FIGS. 12A and 12B are each a schematic sectional view showing an example of the volume hologram laminate of the present invention. As illustrated in FIG. 12A, a volume hologram laminate 30 according to the present invention is provided with a transfer-receiving member 20 to be transferred, a heat seal layer 3 which is formed on the transfer-receiving member 20 to be transferred and which contains a thermoplastic resin, and a volume hologram layer 2 which is formed on the heat seal layer 3 and in which a volume hologram is recorded.

In such an example, the volume hologram laminate 30 of the present invention is characterized by a forgery preventive cut portion 8 formed so as to penetrate through the heat seal layer 3 and to cut at least a part of the volume hologram layer 2.

Here, FIG. 12B is a schematic view of a volume hologram laminate 30 when normally viewed from the direction of z in FIG. 12A. As illustrated in FIG. 12B, the forgery preventive cut portion 8 is formed in such an aspect in which when it is intended to peel the volume hologram layer 2 from the transfer-receiving member 20 in the volume hologram laminate 30 of the present invention, the volume hologram layer 2 is cut.

According to the present invention, the forgery preventive cut portion is formed so as to penetrate through the heat seal layer and to cut at least a part of the volume hologram layer, which makes it difficult to reapply the volume hologram layer because the volume hologram layer is broken when it is intended to peel the volume hologram layer from the transfer-receiving member in the volume hologram laminate of the present invention, whereby a volume hologram laminate having excellent forgery preventive function can be obtained.

The volume hologram laminate of the present invention is provided with at least a transfer-receiving member, a heat seal layer, a volume hologram layer and a forgery preventive cut portion and may be provided with other layers according to the need.

Each structure used in the volume hologram laminate of the present invention will be explained one by one.

The heat seal layer and volume hologram layer used in the volume hologram laminate of the present invention are the same as those explained in the paragraph "A. Lengthy volume hologram layer transfer foil" and explanations of these layers are omitted here.

1. Transfer-Receiving Member

First, the transfer-receiving member which is used in the volume hologram laminate of the present invention will be explained. No particular limitation is imposed on the transfer-receiving member which is used in the volume hologram laminate of the present invention insofar as it can be bound with the volume hologram layer via the heat seal layer, and the transfer-receiving member may be selected arbitrarily according to, for example, the use of the volume hologram laminate of the present invention. Examples of the transfer-receiving member may include papers used for passports, brochures, gift certificates and the like, various cards such as ID cards, films, clothes, metals and glass.

2. Other Layers

The volume hologram laminate of the present invention is provided with at least the transfer-receiving member, volume hologram layer and heat seal layer and may also be formed with layers other than the layers according to the need. There is no particular limitation to these other layers used in the volume hologram laminate and desired ones selected arbitrarily according to the use of the volume hologram laminate of the present invention may be used. Among these layers, preferable examples of these layers used in the present invention may include a peelable over protection layer formed on the volume hologram layer.

Figure 13:
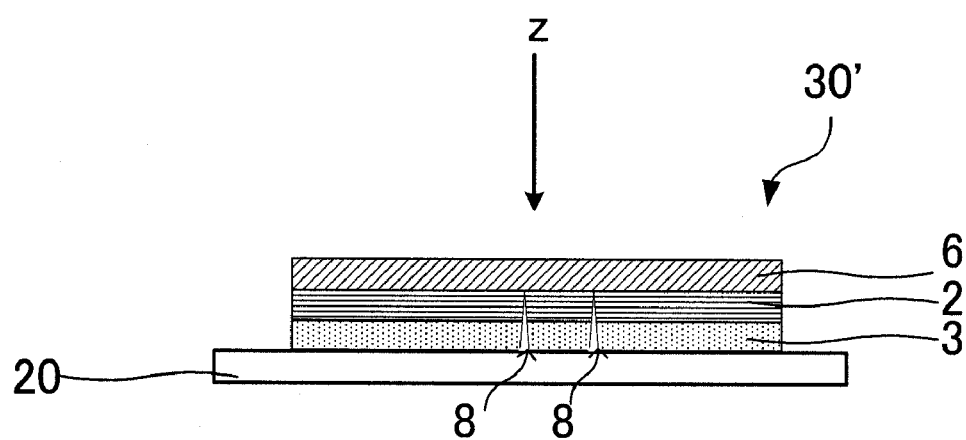
FIG. 13 is a schematic sectional view showing another example of a volume hologram laminate according to the present invention.

The case where the peelable over protection layer is used in the volume hologram laminate of the present invention will be explained with reference to the drawings. FIG. 13 is a schematic sectional view showing an example of the volume hologram laminate of the present invention when the peelable over protection layer is used in the volume hologram laminate. As shown in FIG. 13, a volume hologram laminate 30' according to the present invention may have a structure in which a peelable over protection layer 6 is formed on a volume hologram layer 2. The symbols 8 and 20 in FIG. 13 show the same parts as those used in FIG. 12.

The details of the peelable over protection layer used in the volume hologram laminate of the present invention are the same as those explained in the paragraph "A. Lengthy volume hologram layer transfer foil" and therefore, explanations of this protective layer are omitted here.

Besides the above layers, the primer layer and barrier layer which are explained in the paragraph "A. Lengthy volume hologram layer transfer foil" may be used as the aforementioned other layers to be used in the volume hologram laminate of the present invention.

3. Forgery Preventive Cut Portion

A forgery preventive cut portion may be formed in the volume hologram laminate of the present invention. The forgery preventive cut portion used in the present invention is obtained from the pre-forgery preventive cut portion as follows: the pre-forgery preventive cut portion is transferred together with the transfer portion when the lengthy volume hologram layer transfer foil of the present invention is transferred to the transfer-receiving member as mentioned above in the paragraph "6. Pre-forgery preventive cut portion" of "A. Lengthy volume hologram layer transfer foil", to constitute the forgery preventive cut portion. In the case of intending to peel the volume hologram layer from the transfer-receiving member in the volume hologram laminate, the volume hologram layer is easily broken at the forgery preventive part as the starting point, whereby a forgery preventive effect can be obtained, because the volume hologram laminate of the present invention is provided with the forgery preventive cut portion.

Moreover, as mentioned above in the paragraph "1. Cut portion" of "A. Lengthy volume hologram layer transfer foil", when the cut portion is formed in the form of plural line cut portions, apart of these plural line cut portions are transferred to the transfer-receiving member when the volume hologram is transferred to form the forgery preventive cut portion. This brings about the result, for example, that the volume hologram laminate produced by transferring the lengthy volume hologram layer transfer foil of the present invention is provided with the forgery preventive cut portion. When it is intended to peel the volume hologram layer from the transfer-receiving member of the volume hologram laminate, the volume hologram layer is easily broken at the forgery preventive cut portion as the original point, whereby a forgery preventive effect can be obtained.

Figure 14A:
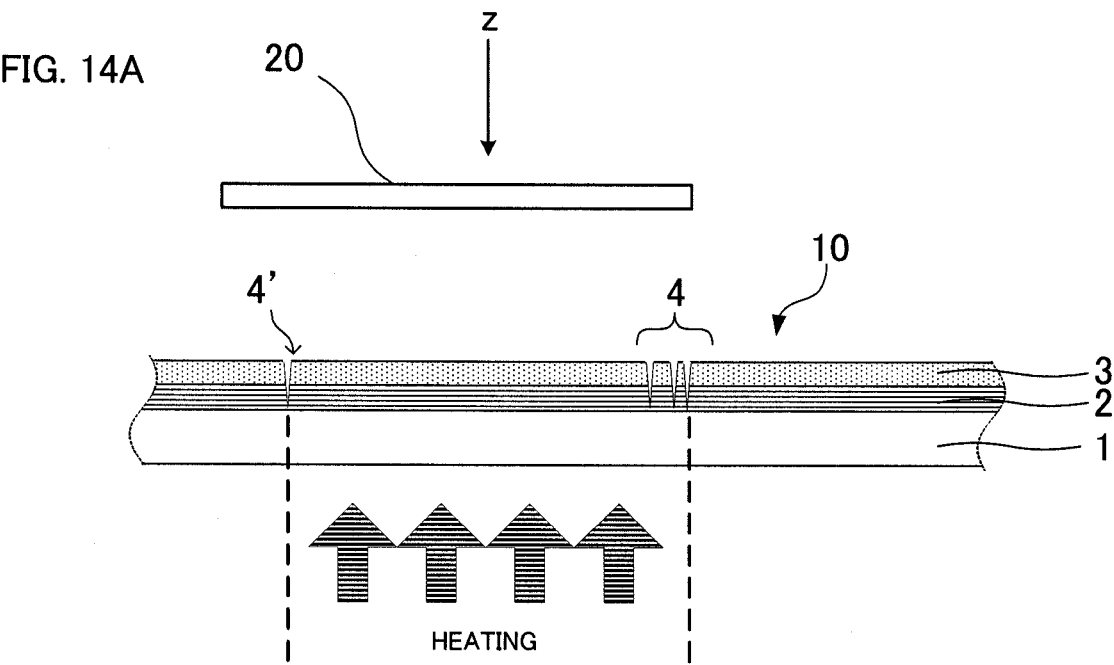
FIGS. 14A and 14B are each a schematic sectional view showing a further example of a lengthy volume hologram layer transfer foil according to the present invention.
Figure 14B:
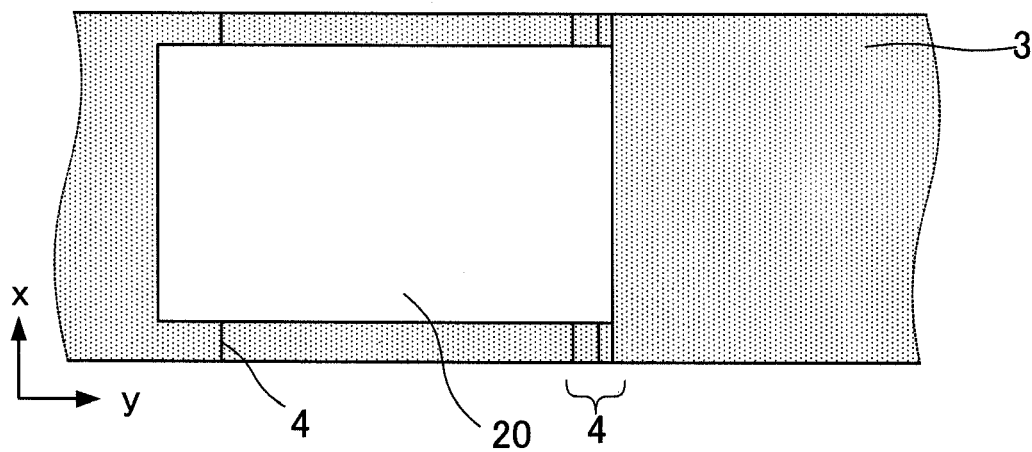
Figure 15A:
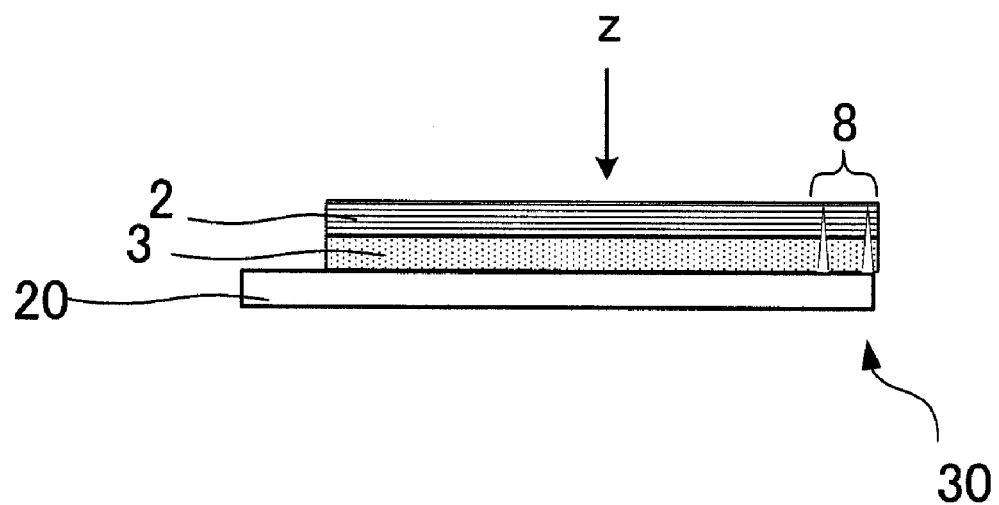
FIGS. 15A and 15B are each a schematic view showing a further example of a volume hologram laminate according to the present invention.
Figure 15B:
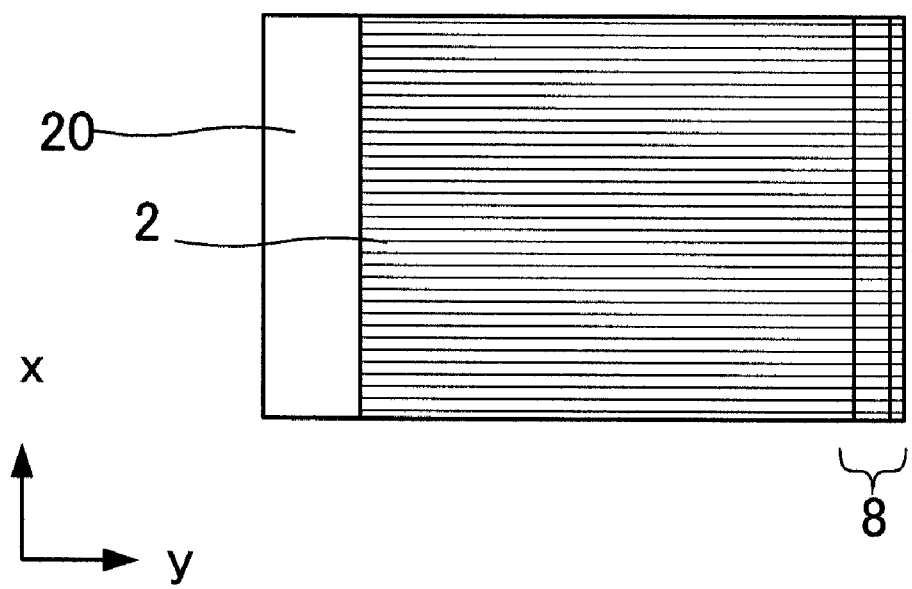

Here, in the aspect in which the cut portion is made in the form of plural line-shaped cut portions, a part of the cut portion is transferred to the transfer-receiving member to form the forgery preventive cut portion. These procedures are explained with reference to the drawings. FIGS. 14A and 14B are each a schematic view showing an example of the lengthy volume hologram layer transfer foil of the present invention. As illustrated in FIG. 14A, three line-shaped cut portions 4 and one cut portion 4' are formed in a direction perpendicular to the longitudinal direction of the lengthy volume hologram layer transfer foil 10 of the present invention. In this case, the cut portions 4 and the cut portion 4' are each the cut portion explained in the paragraph "1. Cut portion" of "A. Lengthy volume hologram layer transfer foil". However, these parts are called the cut portions 4 and the cut portion 4' for the sake of explanatory convenience. One line-shaped cut portion among the plural line-shaped cut portions 4 and the cut portion 4' are formed at the ends in the directions of the widths of the heating area respectively when the heat seal layer 3 is heated. Here, FIG. 14B is a schematic view of the lengthy volume hologram layer transfer foil 10 of the present invention when normally viewed from the direction of z in FIG. 14A. As illustrated in FIG. 14B, the plural line-shaped cut portions 4 and cut portion 4' are formed in parallel to each other so as to extend over the full width in a direction x perpendicular to the longitudinal direction y of the lengthy volume hologram layer transfer foil 10. The transfer-receiving member 20 is set such that, among the plural line-shaped cut portions 4, one cut portion formed at the position which accords to the end in the direction of the full width of the heating area is overlapped on the end of the transfer-receiving member 20. FIGS. 15A and 15B are each a schematic view showing an example of the volume hologram laminate of the present invention. FIG. 15A is a view showing a volume hologram laminate 30 produced by transferring the lengthy volume hologram layer transfer foil 10 shown in FIG. 14A to the transfer-receiving member 20. FIG. 15B is a schematic view of the volume hologram layer 30 when normally viewed from the direction of z in FIG. 15A. Two line-shaped cut portions among the cut portion 4 made in the form of plural-line like cut portions on the lengthy volume hologram layer transfer foil 10 as shown in FIG. 14A are transferred to the transfer-receiving member 20, to constitute a forgery preventive cut portion 8 as illustrated in FIGS. 15A and 15B, whereby a forgery preventive effect can be attained in the volume hologram laminate 30 of the present invention. The symbols 1, 2 and 3 in FIGS. 14A-14B and 15A-15B show the same parts as those used in FIGS. 1A and 1B. The details of the forgery preventive part according to the present invention are the same as those explained in the paragraph "6. Pre-forgery preventive cut portion" of "A. Lengthy volume hologram layer transfer foil" and therefore, explanations of this part are omitted here.

4. Volume Hologram Laminate

Figure 16A:
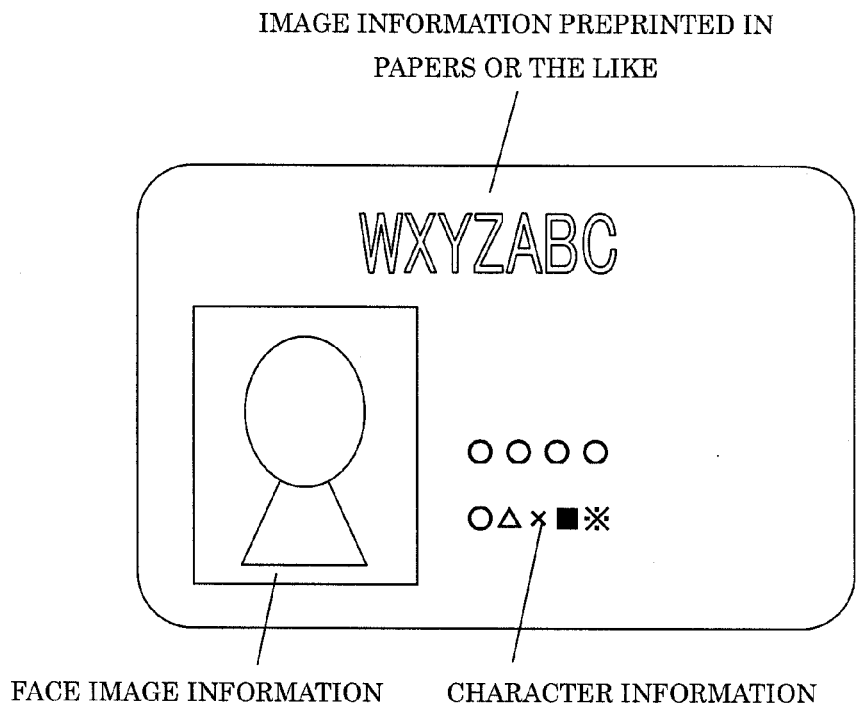
FIGS. 16A and 16B are each a schematic view showing specific examples of a transfer-receiving member used in the present invention and a volume hologram laminate according to the present invention.
Figure 16B:
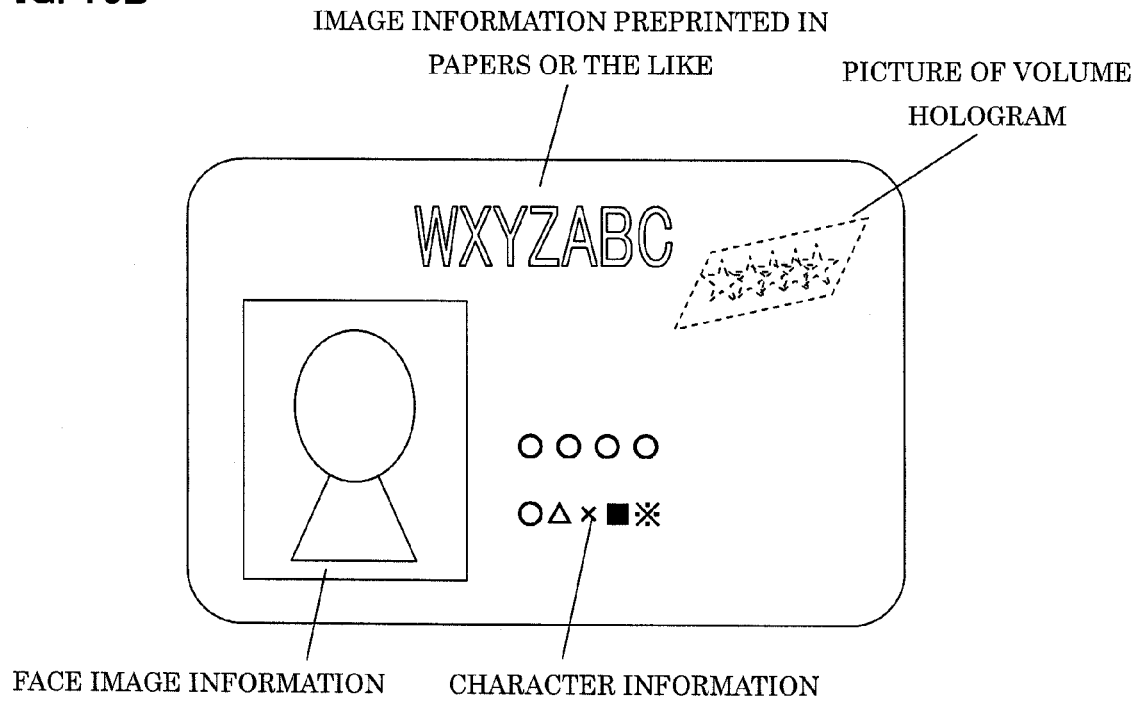

The volume hologram laminate in the present invention is provided with the transfer-receiving member, heat seal layer and volume hologram layer, and therefore, besides various information recorded in advance in the transfer-receiving member, information such as an image based on the volume hologram is further added. The volume hologram laminate in the present invention will be explained in detail with reference to the drawings. FIGS. 16A and 16B are each a schematic view showing a specific example of the volume hologram laminate of the present invention and the transfer-receiving member which is to be used in the present invention. As illustrated in FIG. 16A, as the transfer-receiving member which is used in the present invention, those in which face image information, character information, picture information and the like are recorded in advance may be used. Then, as illustrated in FIG. 16B, the volume hologram laminate of the present invention has further information recorded therein when the volume hologram transfer foil is transferred to the transfer-receiving member as illustrated in FIG. 16A.

5. Method of Producing the Volume Hologram Laminate

The volume hologram laminate of the present invention may be produced using a commonly known method. As to specific examples of the method of producing the volume hologram laminate, the volume hologram laminate may be produced by using the method used in the paragraph "C. Method of producing the volume hologram laminate" which will be explained later.

C. Method of Producing the Volume Hologram Laminate

Next, a method of producing a volume hologram laminate according to the present invention will be explained. As previously mentioned, the method of producing a volume hologram laminate according to the present invention comprises: a transfer-receiving member setting step of using the lengthy volume hologram layer transfer foil according to the present invention to set a transfer-receiving member on the heat seal layer of the lengthy volume hologram layer transfer foil such that the transfer-receiving member is overlapped on the cut portion formed on the lengthy volume hologram layer transfer foil; a heating-adhesion step of heating the heat seal layer so as to make the heat seal layer have such a shape that at least one side thereof is overlapped on the cut portion to adhere the heated area of the heat seal layer to the transfer-receiving member; and a substrate peeling step of peeling the substrate of the lengthy volume hologram layer transfer foil disposed on the area adhered to the transfer-receiving member at the position where the cut portion of the lengthy volume hologram layer transfer foil as the starting point.

Figure 17A:
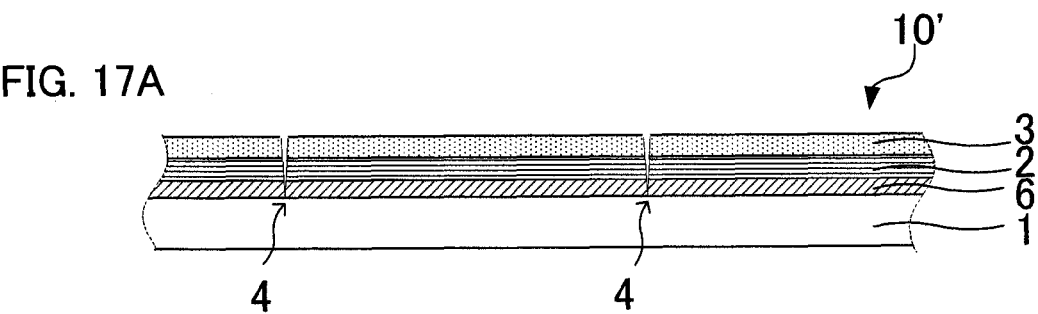
FIGS. 17A to 17E are a schematic view showing an example of a method of producing a volume hologram laminate according to the present invention.
Figure 17B:
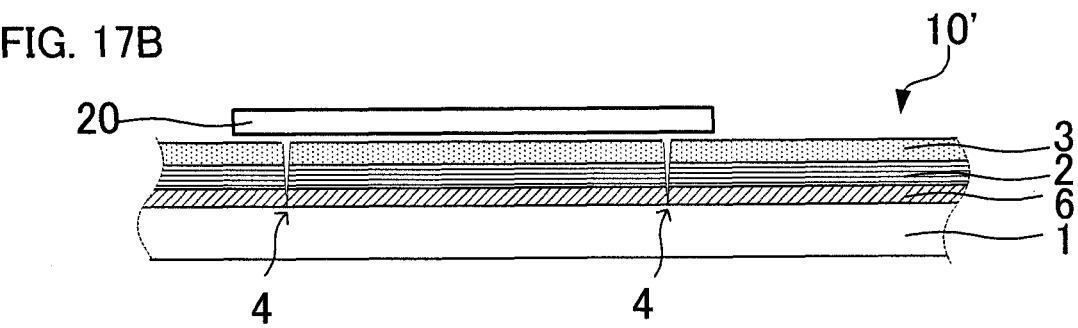
Figure 17C:
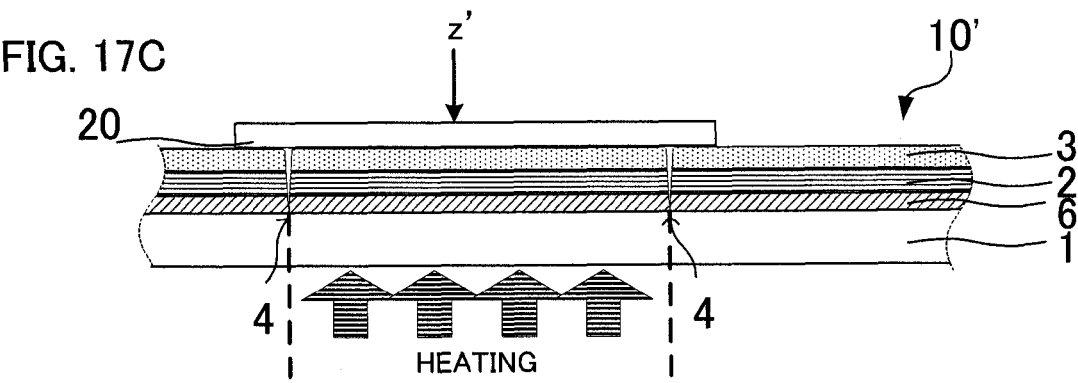
Figure 17D:
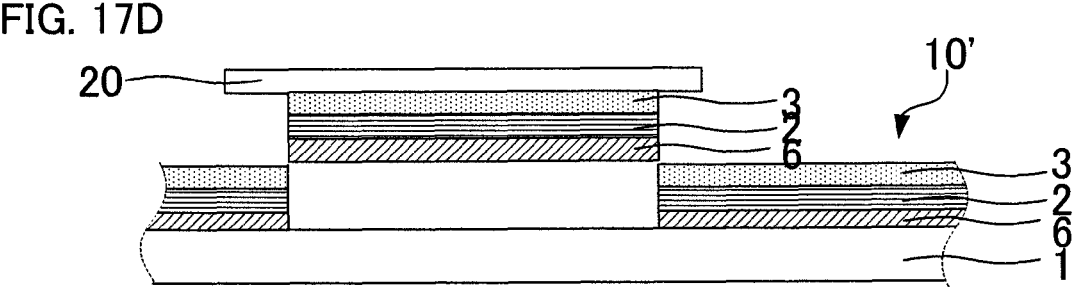
Figure 17E:
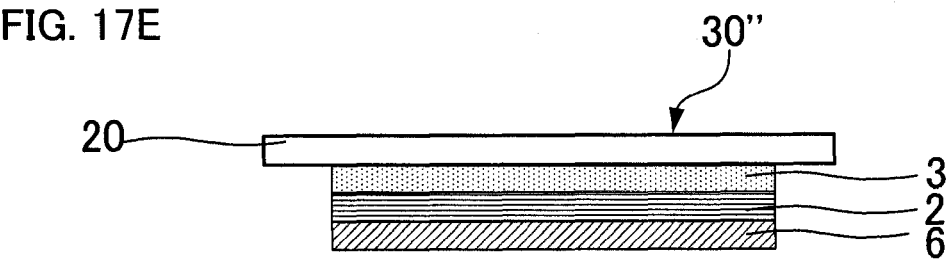

This method of producing a volume hologram laminate according to the present invention will be explained with reference to the drawings. FIGS. 17A to 17E are a schematic view showing an example of the method of producing a volume hologram laminate. As illustrated in FIG. 17A to 17E, the method of producing a volume hologram laminate according to the present invention comprises: a transfer-receiving member setting step of using the lengthy volume hologram layer transfer foil 10' according to the present invention (FIG. 17A) to set a transfer-receiving member 20 on the heat seal layer 3 of the lengthy volume hologram layer transfer foil 10' such that the transfer-receiving member is overlapped on the cut portion 4 formed on the lengthy volume hologram layer transfer foil (FIG. 17B); a heating-adhesion step of heating the heat seal layer 3 such that at least one side of the heat seal layer 3 is overlapped on the vertical cut portion 4 formed on the lengthy volume hologram layer transfer foil 10' to adhere the heated area of the heat seal layer 3 to the transfer-receiving member 20 (FIG. 17C); and a substrate peeling step of peeling the substrate 1 of the lengthy volume hologram layer transfer foil 10' disposed on the area adhered to the transfer-receiving member 20 at the position where the cut portion 4 of the lengthy volume hologram layer transfer foil 10' as the starting point (FIG. 17D), to produce a volume hologram laminate 30" in which the heat seal layer 3 and the volume hologram layer 2 are laminated in this order on the transfer-receiving member 20 (FIG. 17E).

Figure 18A:
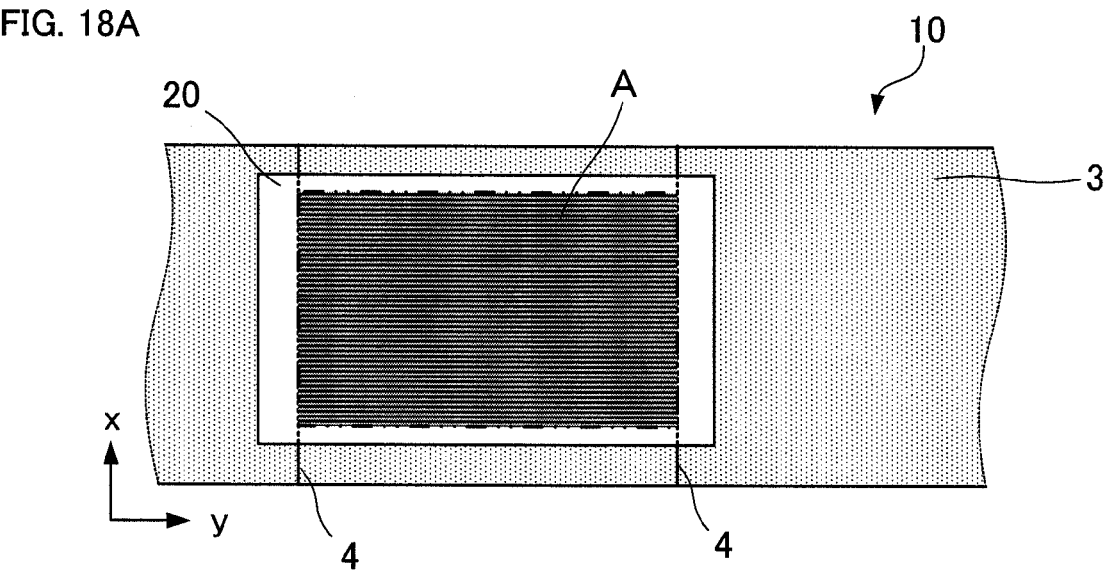
FIGS. 18A and 18B are a schematic view showing an example of a heating-adhesion step in the present invention.
Figure 18B:
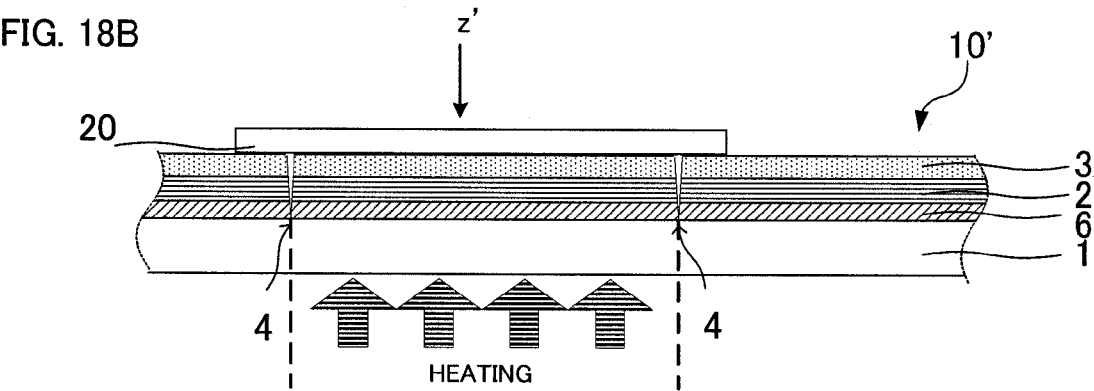

Here, FIGS. 18A and 18B are a schematic view illustrating the heating-adhesion step and FIG. 18A is a view normally viewed from the direction of z' in FIG. 18B. As illustrated in FIG. 18A, the present invention is characterized by the structure in which the area A heated in the heating-adhesion step has such a shape that at least one side thereof is overlapped on the cut portion 4.

According to the present invention, the lengthy volume hologram layer transfer foil of the present invention is used as the lengthy volume hologram layer transfer foil, the heat seal layer is heated so as to have a shape such that at least one side thereof is overlapped on the cut portion in the heating-adhesion step and the substrate is peeled at the position where the cut portion is formed in the substrate peeling step, whereby the breaking failure of the volume hologram layer along with the transfer operation can be prevented.

Therefore, the present invention ensures that a volume hologram laminate can be produced stably by continuously transferring a volume hologram to a prescribed position of the transfer-receiving member.

The method of producing a volume hologram laminate according to the present invention involves at least the transfer-receiving member setting step, heating-adhesion step and substrate peeling step.

Each step used in the present invention will be explained one by one.

1. Transfer-Receiving Member Setting Step

First, the transfer-receiving member setting step used in the present invention will be explained. In this step, as mentioned above, the lengthy volume hologram layer transfer foil according to the present invention is used to set the transfer-receiving member on the heat seal layer of the lengthy volume hologram layer transfer foil such that the transfer-receiving member is overlapped on the cut portion formed on the lengthy volume hologram layer transfer foil.

Here, the lengthy volume hologram layer transfer foil used in this step is the same as that explained in the paragraph "A. Lengthy volume hologram layer transfer foil" and therefore, explanations of this transfer foil are omitted here.

No particular limitation is imposed on the transfer-receiving member which is used in this step insofar as it can be bound with the volume hologram layer via the heat seal layer with which the lengthy volume hologram layer transfer foil is provided, and the transfer-receiving member may be selected arbitrarily according to, for example, the use of the volume hologram laminate produced by the present invention. Examples of the transfer-receiving member to be used in this step may include papers used for brochures, gift certificates and the like, various cards, films and clothes.

There is no particular limitation to the position where the transfer-receiving member is set in this step insofar as it is a position which is above the heat seal layer of the lengthy volume hologram layer transfer foil and at which the transfer-receiving member is overlapped on the cut portion formed on the lengthy volume hologram layer transfer foil. Here, the case where the cut portion is overlapped on the end of the transfer-receiving member is included in the term "overlapped" in this step.

Figure 19A:
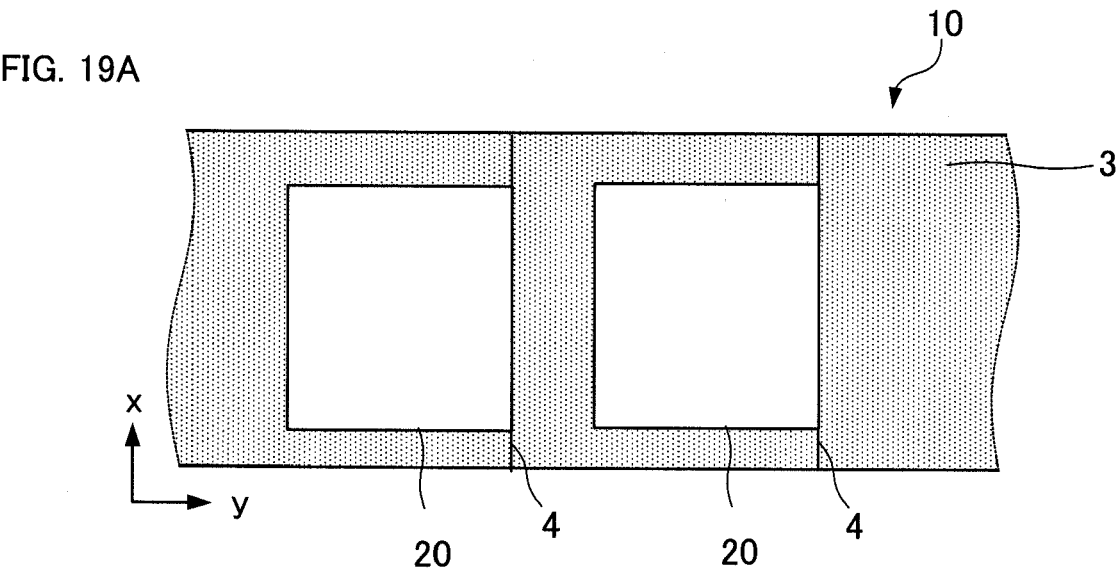
FIGS. 19A and 19B are a schematic view showing an example of a transfer-receiving member setting step in the present invention.
Figure 19B:
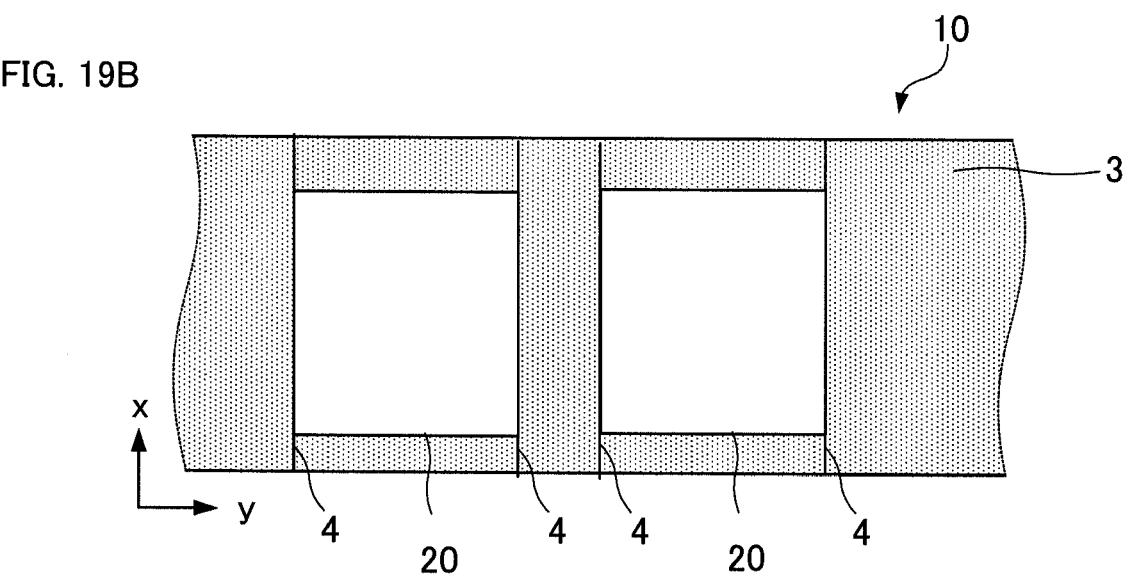

When plural cut portions are formed on the lengthy volume hologram layer transfer foil used in this step, the aspect in which the transfer-receiving member is set may be an aspect in which, as illustrated in FIG. 19A, the transfer-receiving part is overlapped on at least one cut portion, or may be an aspect in which, as illustrated in FIG. 19B, the transfer-receiving part is overlapped on two cut portions.

Figure 20A:
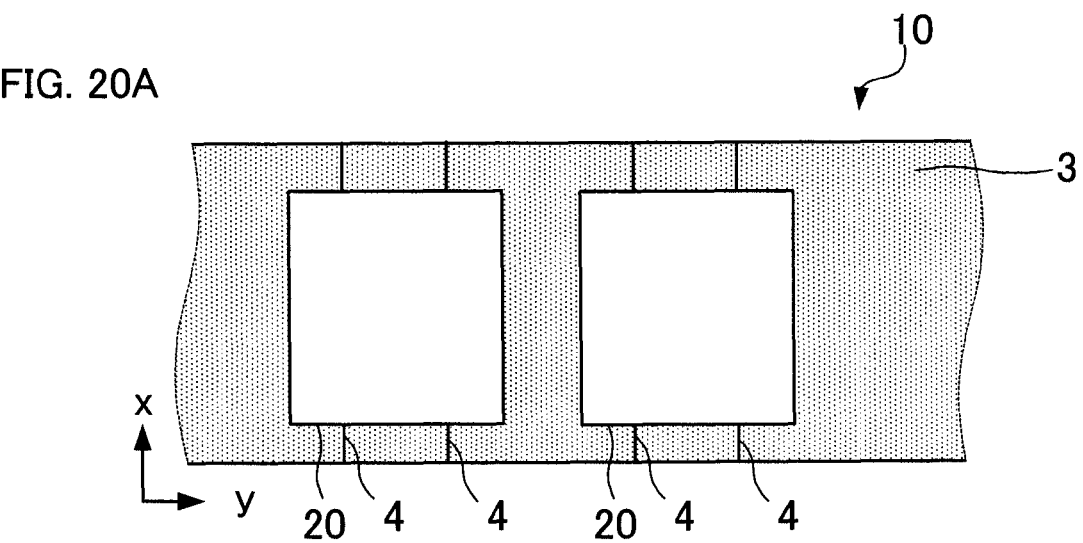
FIGS. 20A to 20C are a schematic view showing another example of a transfer-receiving member setting step in the present invention.
Figure 20B:
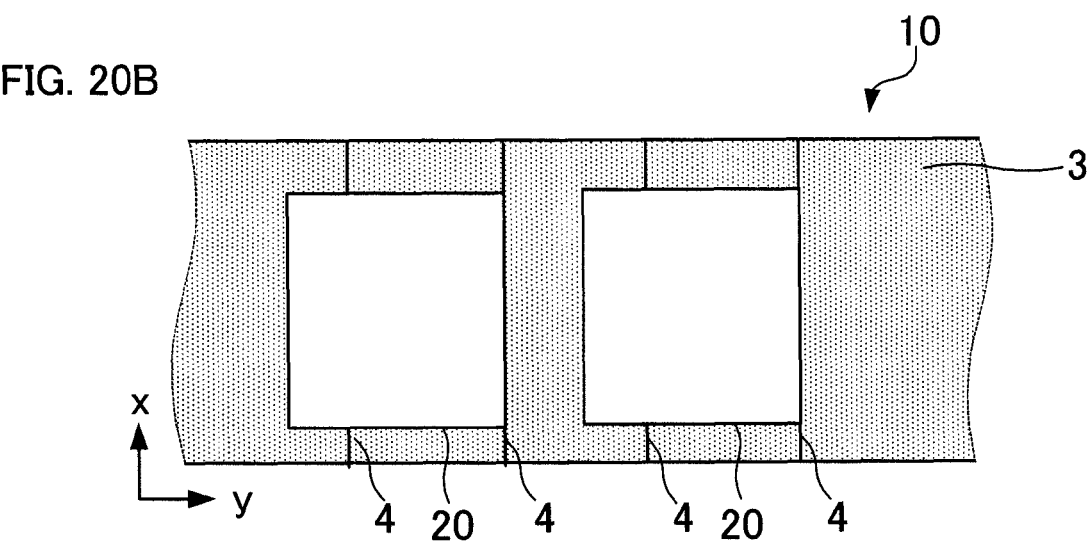
Figure 20C:
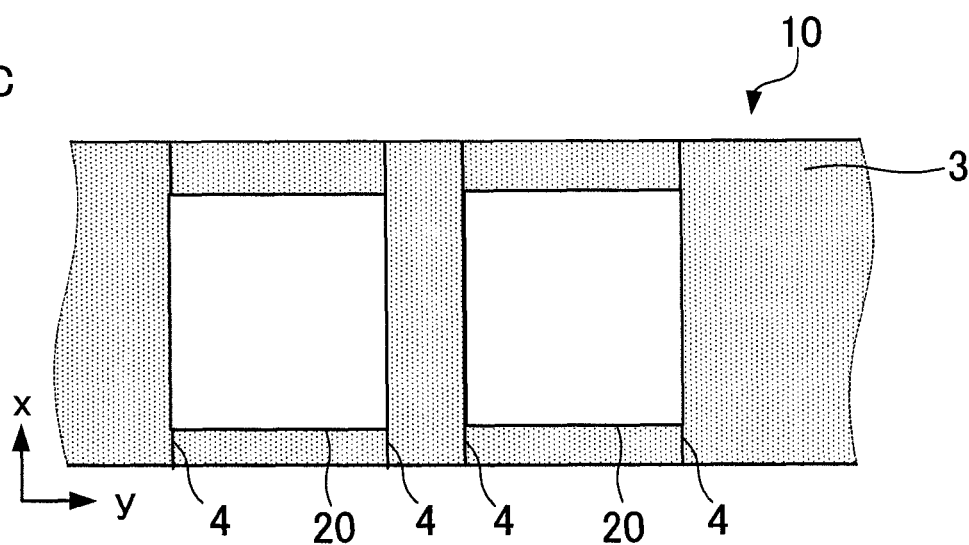

Examples of the aspect in which the transfer-receiving member is set so as to overlap on two cut portions may include: an aspect in which, as illustrated in FIG. 20A, two cut portions are both disposed so as not to overlap on the end of the transfer-receiving member; an aspect in which, as illustrated in FIG. 20B, one cut portion is disposed so as to overlap on the end of the transfer-receiving member; and an aspect in which, as illustrated in FIG. 20C, two cut portions is disposed so as to overlap on the end of the transfer-receiving member. In this step, any of these aspects may be preferably used.

Figure 21:
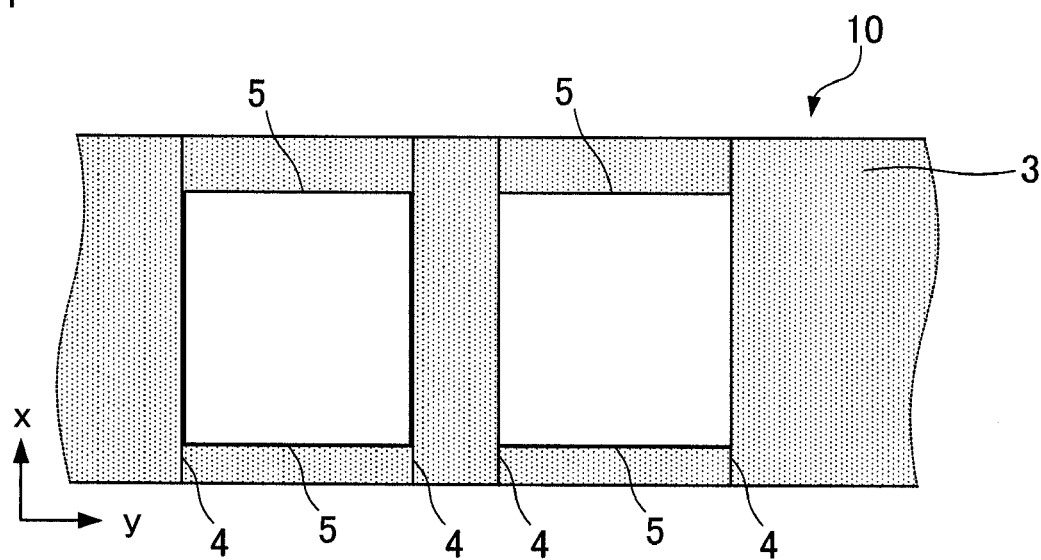
FIG. 21 is a schematic view showing a further example of a transfer-receiving member setting step in the present invention.

When the cut portion is formed in combination with the parallel cut portions in the lengthy volume hologram layer transfer foil used in this step, the transfer-receiving member is preferably set so as to also overlap on the parallel cut portions in this step. Such a case will be explained with reference to the drawings. When, as illustrated in FIG. 21, the cut portion 4 is formed in combination with the parallel cut portions 5 in the lengthy volume hologram layer transfer foil 10 used in this step, the transfer-receiving member 20 is preferably set so as to overlap not only on the cut portion 4 but also on the parallel cut portion 5.

The aspect in which the transfer-receiving member is overlapped on the parallel cut portions may be: an aspect in which the end of the transfer-receiving member is overlapped on the parallel cut portion, or an aspect in which the end of the transfer-receiving member is not overlapped on the parallel cut portion.

2. Heating-Adhesion Step

Next, the heating-adhesion step used in the present invention will be explained. In this step, as mentioned above, the heat seal layer is heated such that it has such a shape that at least one side of the transfer-receiving member is overlapped on the cut portion formed on the lengthy volume hologram layer transfer foil under the situation where the transfer-receiving member is set on the heat seal layer of the lengthy volume hologram layer transfer foil, to thereby bind the heated area of the heat seal layer with the transfer-receiving member. In this step, the term "heating the heat seal layer" also implies the case of heating the lengthy volume hologram layer transfer foil used in the present invention.

No particular limitation is imposed on the aspect in which the heat seal layer is heated in this step insofar as it is an aspect in which the heat seal layer is heated such that it has such a shape that at least one side of the heat seal layer is overlapped on the cut portion formed on the lengthy volume hologram layer transfer foil. There is no particular limitation to such a shape and this shape may be optionally determined according to factors such as the use of the volume hologram laminate produced by the present invention. Examples of the shape may include polygonal shapes such as a triangular shape, tetragonal shape, pentagonal shape and hexagonal shape and ellipsoidal shape.

Figure 22A:
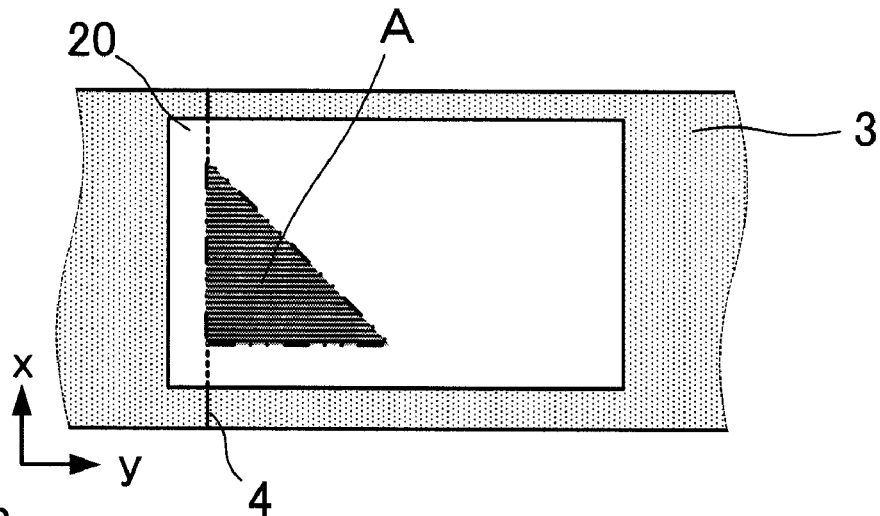
FIGS. 22A to 22C are a schematic view showing another example of a heating-adhesion step in the present invention.
Figure 22B:
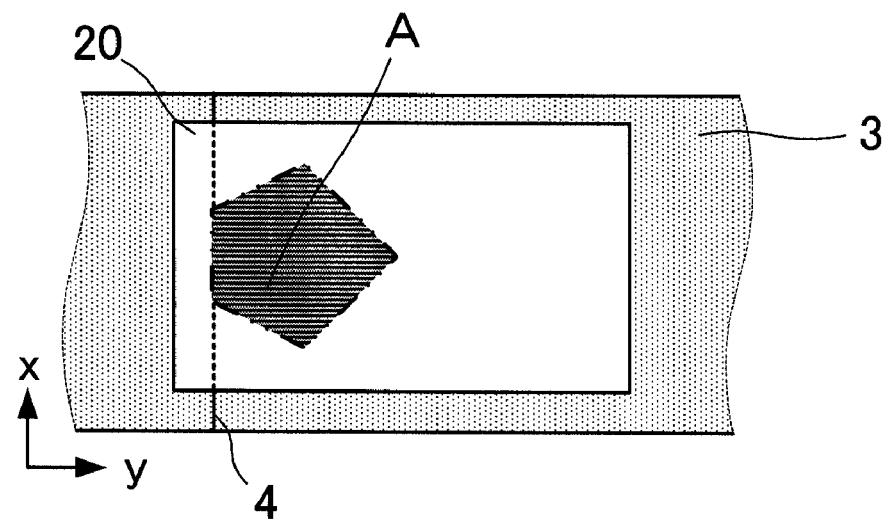
Figure 22C:
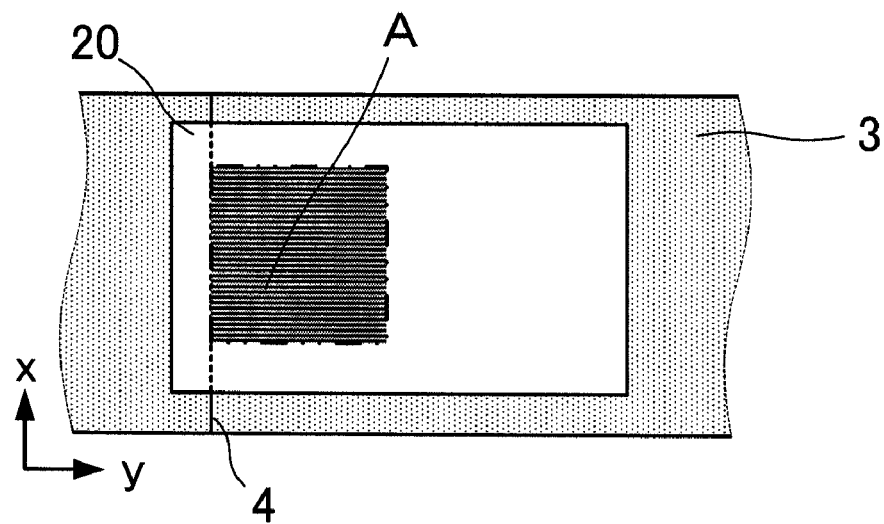

The shape obtained by heating the heat seal layer in this step will be explained with reference to the drawings. FIGS. 22A-22C and 23A-23E are schematic views showing an example of the aspect in which the heat seal layer is heated in this step. FIGS. 22A to 22C are a schematic view showing an example of an aspect in which the heat seal layer is heated such that it has such a shape that one side thereof is overlapped on the cut portion. FIGS. 23A to 23E are a schematic view shown an example of an aspect in which the heat seal layer is heated such that it has such a shape that two sides thereof are overlapped on the cut portion. As illustrated in these drawings, no particular limitation is imposed on the shape (shape of the area indicated by A in FIGS. 22A-22C and 23A-23E) obtained by heating the heat seal layer 3 insofar as it is a shape ensuring that at least one side of the heat seal layer is overlapped on the cut portion 4.

Figure 23A:
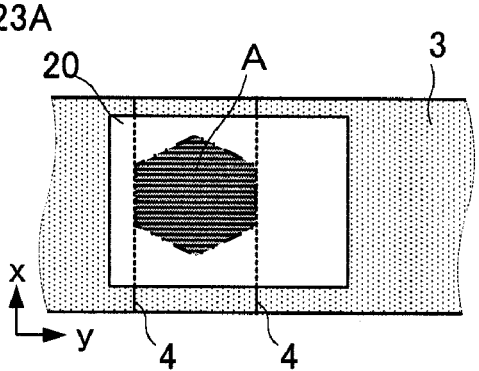
FIGS. 23A to 23E are a schematic view showing a further example of a heating-adhesion step in the present invention.
Figure 23B:
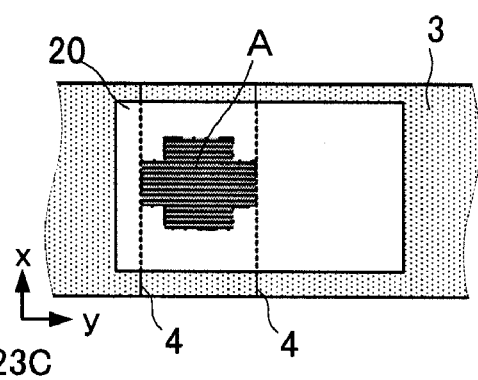
Figure 23C:
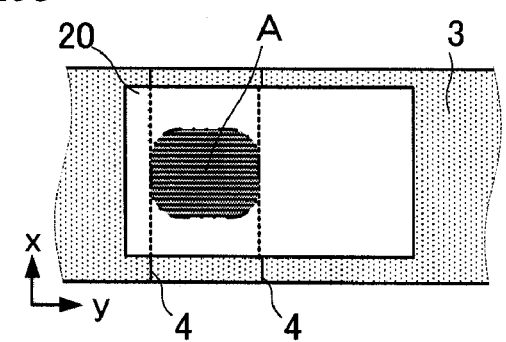
Figure 23D:
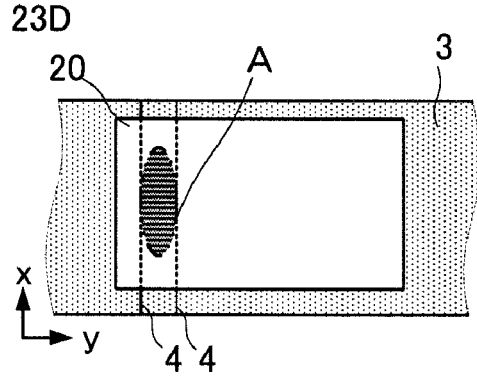
Figure 23E:
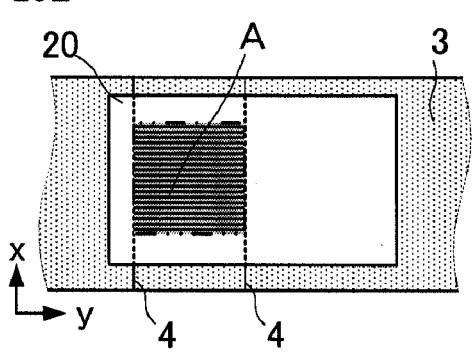

In the present invention, a corner-rounded polygonal shape as shown in FIG. 23C is included in the "polygonal shape".

In this step, any of these shapes may be preferably used. Among these shapes, the heat seal layer is preferably heated such that it has such a shape that two sides thereof are overlapped on the cut portion, when the transfer-receiving member is overlapped on two cut portions.

In this step, no particular limitation imposed on the measures heating the heat seal layer insofar as only a desired area is heated to a specified temperature. Examples of such a method may include a method using a heating roller and hot press and hot stamp. Any of these methods may be preferably used in this step.

3. Substrate Peeling Step

Next, the substrate peeling step used in the present invention will be explained. In this step, as mentioned above, the substrate of the lengthy volume hologram layer disposed on the area bound with the transfer-receiving member is peeled at the position where the cut portion of the lengthy volume hologram layer transfer foil is formed as the starting point.

No particular limitation is imposed on the method for peeling the substrate in this step insofar as only the substrate disposed in the area bound with the transfer-receiving member can be peeled. Usually, a method is used in which the substrate is peeled by physically separating the lengthy volume hologram layer transfer foil from the transfer-receiving member. In this step, the end of the area bound with the transfer-receiving member accords to the position where the cut portion is formed. Therefore, even if the transfer foil is peeled from the transfer-receiving member by such a method, a favorable transfer operation can be attained without any breaking failure of the volume hologram layer.

The present invention is not limited to the aforementioned embodiments. These embodiments are examples and whatever has substantially the same structure and produces the same action effect as the technical spirit described in the claim of the present invention is included by the technical scope of the present invention.

EXAMPLES

The present invention will be explained in more detail by way of examples, which are not intended to be limiting of the present invention.

1. Example 1

First Laminate

A PET film (trade name: Lumirror T60 (50 μm), manufactured by Toray Industries, Inc.) was prepared as a first film and a volume hologram recording material having the following composition was applied to the PET film in a dry film thickness of 7 μm by gravure coating as a hologram forming material. A surface releasing treatment PET film (trade name: SP-PET (50 μm), manufactured by Tohcello Co., Ltd.) was laminated on the coating surface to produce a first laminate.
<Composition of the Volume Hologram Recording Material>

| | |
|---|---|
| Binder resin (polymethylmethacrylate-based resin (molecular weight: 200,000)): | 50 parts by weight |
| 3,9-diethyl-3'-carboxymethyl-2,2'-thiacarbocyanine iodine salt: | 0.5 part by weight |
| Diphenyliodoniumhexafluoroantimonate: | 6 parts by weight |
| 2,2-bis(4-(acryloxydiethoxy)phenyl)propane: | 80 parts by weight |
| 1,6-hexanediol diglycidyl ether: | 80 parts by weight |
| Fluorine-based microparticles: | 8 parts by weight |
| Solvent (methyl isobutyl ketone/n-butanol = 1/1 (weight ratio): | 200 parts by weight |

(Second Laminate of Substrate/Protective Layer)

A PET film (trade name: Lumirror T60 (50 μm), manufactured by Toray Industries, Inc.) was prepared as a second film and, as a protective layer, a material having the following composition was applied to the PET film in a dry film thickness of 1 μm by gravure coating.

<Composition of the Protective Layer Forming Material>

| | |
|---|---|
| Polymethylmethacrylate resin (molecular weight: 35000): | 97 parts by weight |
| Polyethylene wax (molecular weight: 10000, average particle diameter: 5 μm): | 3 parts by weight |
| Solvent (methyl ethyl ketone/toluene = 1/1 (weight ratio): | 400 parts by weight |

(Recording of a Volume Hologram)

A Lippmann hologram was taken and recorded in the laminate of the first film/volume hologram recording material layer/surface releasing type treatment PET film by using laser light having a wavelength of 532 nm. After the recording was finished, this laminate was heated in an atmosphere kept at 100° C. for 10 minutes. After the heating, the surface releasing type treatment PET film was peeled to expose the volume hologram recording material layer. The second film/protective layer laminate was overlapped on the exposed volume hologram recording material layer in such a manner that the protective layer side of the laminate was in contact with the volume hologram recording material layer and the resulting laminate was made to pass through the space between a nipped pair of heat rollers at 80° C. to obtain a first film/volume hologram layer/protective layer/second film laminate. Then, the entire surface of the laminate was irradiated with ultra violet light at a dose of 2500 mJ/cm$^2$ by using a high-pressure mercury lamp to fix the volume hologram recording material layer.

(Coating of a Heat Seal Layer)

The first film was peeled from the first film/volume hologram layer/protective layer/second film laminate produced above and a material having the following composition was applied to the volume hologram layer by gravure coating such that the dry film thickness was 4 μm.

<Composition of the Heat Seal Layer Forming Material>

| | |
|---|---|
| Polyester resin (trade name: Vylon, manufactured by TOYOBO., Ltd., Tg: −15° C., molecular weight: 28000): | 20 parts by weight |
| Solvent (methyl ethyl ketone/toluene = 1/1 (weight ratio): | 80 parts by weight |

(Production of the Cut Portion)

A vertical cut portion was made across the surface in a direction perpendicular to the longitudinal direction of the film by using a trimming machine (trade name: OPM-HL300-S, manufactured by Onda MFG., LTD) from the heat seal surface of the hologram transfer foil manufactured in the above manner. As to the vertical cut portion, hologram transfer foils were prepared in which: (1) one cut portion was formed across the surface in a direction perpendicular to the longitudinal direction of the film, (2) five cut portions were formed at intervals of 0.3 mm across the surface in a direction perpendicular to the longitudinal direction of the film, and (3) a number of broken cut portions were formed within a range of a width of 1.5 mm across the surface in a direction perpendicular to the longitudinal direction of the film. Further, a hologram transfer foil (4) was prepared in which a cut portion which was 5 by 5 cm square was formed.

(Thermal Transfer)

The hologram transfer foils in which the cut portions of the above (1) to (3) were formed respectively were subjected to a test to evaluate transfer characteristics by using a commercially available heat laminator for producing a card under condition of a transfer temperature of 150° C. and a transfer speed of 1 m/min. In the case of above (1), when the end of the card was overlapped on the cut position of the transfer foil, the transfer foil was broken at the position of the cut portion and therefore, the transfer foil could be entirely transferred to a card. In the each case of the above (2) and (3), when the end of the card was overlapped on the section where the cut portion was present, the transfer foil was broken and therefore, the transfer foil could be entirely transferred to the card. In the case of the above (4), the transfer characteristics of the hologram transfer foil was evaluated by transferring the hologram transfer foil to a vinyl chloride card by using a hot stamp machine under condition of a temperature of 150° C. and a pressure of 0.8 MPa. When a mold, which was shaped as 5 by 5 cm square, was used to transfer the cut portion of the transfer foil by hot stamping, the transfer foil could be finely transferred in the form of 5 by 5 cm square.

2. Example 2

The processes before and including the coating of the heat seal layer was carried out in the same manner as in Example 1 to manufacture a hologram transfer foil.

(Production of the Cut Portion and Pre-Forgery Preventive Cut Portion)

A vertical cut portion was made on a part of the surface in a plane direction perpendicular to the longitudinal direction of the film by using a trimming machine (trade name: OPM-HL300-S) manufactured by Onda MFG., LTD) from the heat seal surface of the hologram transfer foil manufactured in the above manner. As to the vertical cut portion, hologram transfer foils were prepared in which (1) five cut portions were formed at intervals of 0.3 mm in a plane direction perpendicular to the longitudinal direction of the film in a range excluding the area extending from both ends to the position 5 mm distant from each, end and (2) the same cut portions were made and pre-forgery preventive cut portion was produced in the same method as in the case of the cut portion. As to the structure of the pre-forgery preventive cut portion, one cut portion was made at the position 15 mm apart from the cut portions in the transfer direction in a range excluding the area extending from both ends to the position 5 mm distant from each end in a plane direction perpendicular to the longitudinal direction of the film.

(Thermal Transfer)

The hologram transfer foils in which the cut portions of the above (1) to (2) were respectively formed were tested to evaluate transfer characteristics by using a commercially available heat laminator for producing a card under condition of a transfer temperature of 150° C. and a transfer speed of 1 m/min. In the case of above (1), when the end of the card was overlapped on the cut position of the transfer foil, the transfer foil was broken at the cut position and therefore, the transfer foil could be entirely transferred to a card. It was also confirmed that a part of the plural line-shaped cut portions were transferred to the card to constitute the forgery preventive cut portion. In the case of the above (2), when the end of the card was overlapped on the cut position of the transfer foil in the same manner as in the above (1), the transfer foil was broken at the position of the cut portion and therefore, the transfer foil could be entirely transferred to the card. It was also confirmed that the pre-forgery preventive cut portion was transferred to the card to constitute the forgery preventive cut portion.

2. Comparative Example

A volume hologram transfer foil was manufactured in the same method as in Examples except that the cut portion was not formed.

The hologram transfer foil was subjected to a test to evaluate transfer characteristics by using a commercially available heat laminator for transferring a paper under condition of a transfer temperature of 150° C. and a transfer speed of 1 m/min. As a result, though the transfer foil was bound with the paper, the transfer foil was not subsequently peeled from the substrate but conveyed together with the paper to cause clogging in the printer.

The transfer characteristics of the hologram transfer foil was evaluated by transferring the hologram transfer foil to a vinyl chloride card by using a hot stamp machine under condition of a temperature of 150° C. and a pressure of 0.8 MPa. When a mold, which was 1 by 1 cm square, was used to transfer the cut portion of the transfer foil by hot stamping, the transfer foil could be transferred to the card. However, about 1 mm-wide burrs of the transfer foil were produced and therefore, the transfer foil could not be finely transferred in the form of 1 by 1 cm square.

What is claimed is:

1. A lengthy volume hologram layer transfer foil which is formed lengthwise and which comprises:
   a substrate,
   a volume hologram layer which is formed on the substrate and in which a volume hologram is recorded, and
   a heat seal layer which is formed on the volume hologram layer and which contains a thermoplastic resin,
   wherein the lengthy volume hologram layer transfer foil is provided with a out portion formed so as to penetrate through the heat seal layer and to cut at least a part of the volume hologram layer,
   the cut portion is made in a form of plural line-shaped cuts parallel to each other to function as a unit which are perpendicular to a longitudinal direction to the lengthy volume hologram layer transfer foil and formed over a full width in a direction perpendicular to a longitudinal direction to the lengthy volume hologram layer transfer foil, and
   the plural line-shaped cuts are used to define one edge of a cut area of the lengthy volume hologram layer transfer foil to be transferred to a transfer-receiving member.

2. The lengthy volume hologram layer transfer foil according to claim 1, wherein the cut portion is made in a form of a dotted line-shaped cut portion.

3. The lengthy volume hologram layer transfer foil according to claim 1, wherein the lengthy volume hologram layer transfer foil further comprises a peelable over protection layer formed between the volume hologram layer and the substrate.

4. The lengthy volume hologram layer transfer foil according to claim 1, wherein the lengthy volume hologram layer transfer foil further comprises a pre-forgery preventive cut portion formed so as to penetrate through the heat seal layer and to cut at least the part of the volume hologram layer, at a part of a transfer part which is a part to be transferred to a transfer-receiving member side.

5. A volume hologram laminate comprising:
   a transfer-receiving member,
   a heat seal layer formed on the transfer-receiving member, and
   a volume hologram layer formed on the heat seal layer, wherein the volume hologram laminate is provided with a forgery preventive cut portion formed so as to penetrate through the heat seal layer and to cut at least a part of the volume hologram layer, and
   the forgery preventive cut portion is a part of the plural line-shaped cuts of the lengthy volume hologram layer transfer foil according to claim 1, which plural line-shaped cuts are transferred to the transfer-receiving member.

6. A method of producing a volume hologram laminate, comprising:
   a transfer-receiving member setting step of using the lengthy volume hologram layer transfer foil as described in claim 1 to set a transfer-receiving member on the heat seal layer of the lengthy volume hologram layer transfer foil such that the transfer-receiving member is overlapped on the cut portion formed on the lengthy volume hologram layer transfer foil;
   a heating-adhesion step of heating the heat seal layer so as to make the heat seal layer have such a shape that at least one side thereof is overlapped on the cut portion to adhere a heated area of the heat seal layer to the transfer-receiving member; and
   a substrate peeling step of peeling the substrate of the lengthy volume hologram layer transfer foil disposed on the area adhered to the transfer-receiving member at a position where the cut portion of the lengthy volume hologram layer transfer foil as a starting point.

* * * * *